(12) United States Patent
Ishigami et al.

(10) Patent No.: US 8,294,324 B2
(45) Date of Patent: Oct. 23, 2012

(54) WINDING ARRANGEMENT FOR STATOR OF ROTATING MACHINERY

(75) Inventors: Takashi Ishigami, Hitachinaka (JP); Takashi Naganawa, Kasumigaura (JP); Kenichi Nakayama, Hitachinaka (JP); Tsuyoshi Goto, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 29 days.

(21) Appl. No.: 11/965,215

(22) Filed: Dec. 27, 2007

(65) Prior Publication Data

US 2008/0174199 A1 Jul. 24, 2008

(30) Foreign Application Priority Data

Dec. 28, 2006 (JP) .................... 2006-353654

(51) Int. Cl.
 *H02K 3/04* (2006.01)
(52) U.S. Cl. ...................................... 310/206
(58) Field of Classification Search .............. 310/206
 See application file for complete search history.

(56) References Cited

U.S. PATENT DOCUMENTS

| | | | | | |
|---|---|---|---|---|---|
| 4,402,129 | A | * | 9/1983 | Kreuzer et al. ............. | 29/596 |
| 5,714,824 | A | * | 2/1998 | Couture et al. ............. | 310/208 |
| 6,727,625 | B2 | * | 4/2004 | Ooiwa ........................ | 310/184 |
| 2003/0071534 | A1 | * | 4/2003 | Kreuzer et al. ............. | 310/216 |
| 2003/0214196 | A1 | * | 11/2003 | Cai et al. .................... | 310/208 |
| 2006/0163959 | A1 | | 7/2006 | Ogawa et al. | |

FOREIGN PATENT DOCUMENTS

| | | | |
|---|---|---|---|
| EP | 0 824 288 | A2 | 2/1998 |
| JP | 58-63054 | | 4/1983 |
| JP | 61-293129 | A | 12/1986 |
| JP | 2002-10553 | | 1/2002 |
| JP | 2004320886 | A | * 11/2004 |
| JP | 2005-051981 | | 2/2005 |
| JP | 2006-060880 | | 3/2006 |
| JP | 2006-211810 | | 8/2006 |
| JP | 2006-288123 | | 10/2006 |

OTHER PUBLICATIONS

Japanese Office Action including partial English language dated Jun. 21, 2011 (Seven (7) pages).
Japanese Office Action dated Oct. 4, 2011 (3 Pages) with partial English translation (3 Pages).
Chinese Office Action issued Jun. 12, 2012 and English translation thereof.
Extended European Search Report mailed Aug. 28, 2012.

* cited by examiner

*Primary Examiner* — Quyen Leung
*Assistant Examiner* — Eric Johnson
(74) *Attorney, Agent, or Firm* — Crowell & Moring LLP

(57) ABSTRACT

A rotating machinery is to be provided wherein coils can be wound round a stator core in a minimized state of connected parts. In a rotating machinery comprising a stator formed annularly and a rotor disposed rotatably on the inner periphery side of the stator, the stator comprises a stator core, the stator core having in the circumferential direction a plurality of slots each having a coil inserting portion on the inner periphery side, and coils wound by lap winding within the slots, at least the lap-wound winding portion of the coils in each slot being constituted by a continuous line and wound at a coil end so as to straddle the inner periphery side and the outer periphery side of the slot. According to this construction there is no increase in the number of connected parts even if the number of turns in the winding portion is increased.

7 Claims, 20 Drawing Sheets

FIG. 9A
FIG. 9B
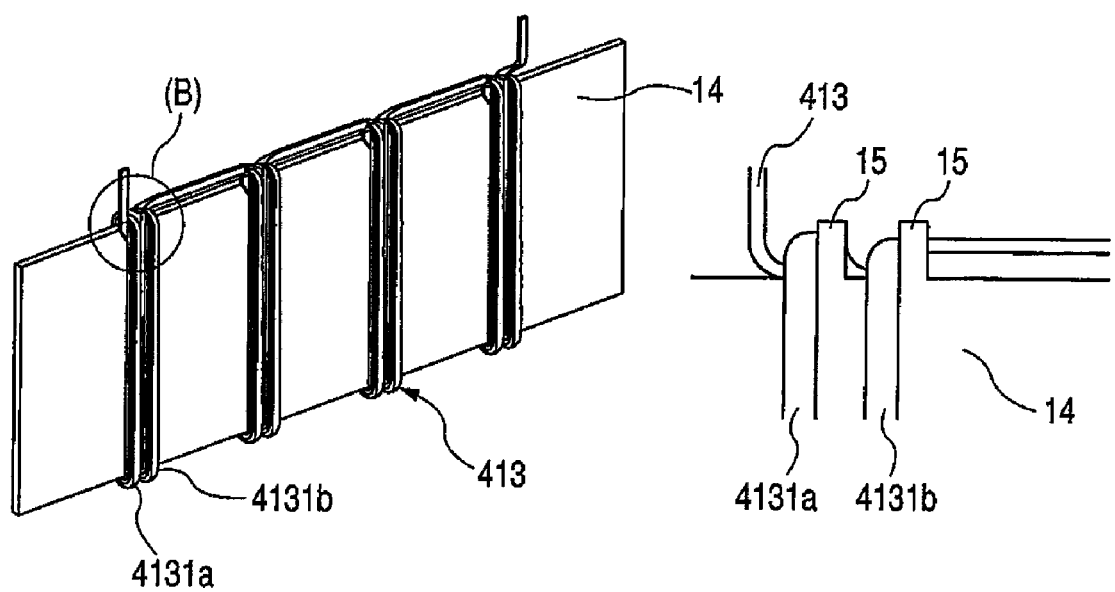
FIG. 10
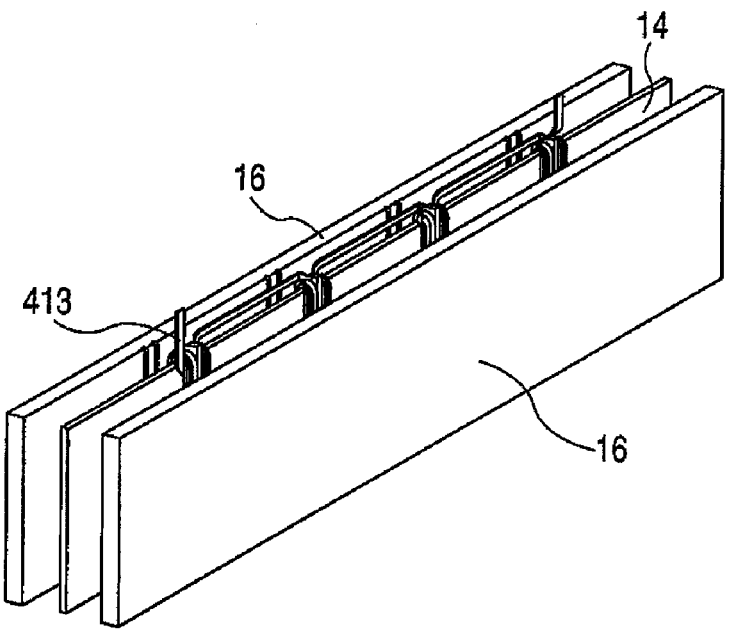

BEFORE INSERTION        AFTER INSERTION

WINDING ARRANGEMENT FOR STATOR OF ROTATING MACHINERY

CLAIM OF PRIORITY

The present application claims priority from Japanese application serial no. 2006-353654, filed on Dec. 28, 2006, the content of which is hereby incorporated by reference into this application.

FIELD OF THE INVENTION

The present invention relates to rotating machinery such as a motor and a generator.

BACKGROUND OF THE INVENTION

In rotating machinery where coils are wound by distributed winding into many slots formed so as to be open to the inner periphery side of a stator core, an alternating current is supplied to the stator coils to generate a rotating magnetic field in the stator, and rotating torque is generated in a rotor by the rotating magnetic field.

As examples of such rotating machineries, there are an induction motor using a cage induction motor rotor and a synchronous motor using a permanent magnet as a rotor. These induction motor and synchronous motor can be utilized also as generators, and therefore by the rotating machinery or machinery as referred to herein, it is meant to include both such induction motor and synchronous motor.

Patent Literature 1 (Japanese Patent Laid-Open Publication No. 2006-211810) shows an example of the above rotating machinery. The rotating machinery shown therein has a rotor core provided with many slots which are open to the inner periphery side and in that rotating machinery a plurality of generally U-shaped segment coils are inserted into each of the slots. According to the description of Patent Literature 1 the rotating machinery disclosed therein is advantageous in that it can be reduced in size and weight.

In rotating machineries of the type in which generally U-shaped segment wires are inserted into each of the aforesaid slots, including the rotating machinery disclosed in Patent Literature 1, it is necessary that respective ends of the segment wires be connected by welding, and this point remains to be solved in point of improving the productivity.

It is an object of the present invention to provide rotating machinery superior in productivity.

SUMMARY OF THE INVENTION

One feature of the rotating machinery of the present invention is that there are used continuous coils of stator winding and the continuous coils are inserted into stator slots. Consequently, it is possible to reduce the number of coil connections in the stator and hence possible to improve the productivity.

Other features of the present invention will be described in detail later in connection with embodiments of the present invention.

In the rotating machinery of the present invention, at least a periphery portion is constituted by continuous coils, the coils being wound so as to straddle both inside and outside of slots at coil ends, and extending portions of the coils extending in continuous directions from the inside of the slots in the stator core extend to both axial end sides of the slots.

Thus, the rotating machinery of the present invention is improved in productivity.

BRIEF DESCRIPTION OF THE DRAWINGS

FIGS. 9A and 9B are a perspective view and an enlarged view with coils wound round a winding form;
FIG. 10 is a perspective view showing a pressed state of coils wound round the winding form;
FIG. 27 is a diagram explaining the state of coils disposed in slots.

DETAILED DESCRIPTION OF PREFERRED EMBODIMENTS

Figure 1:
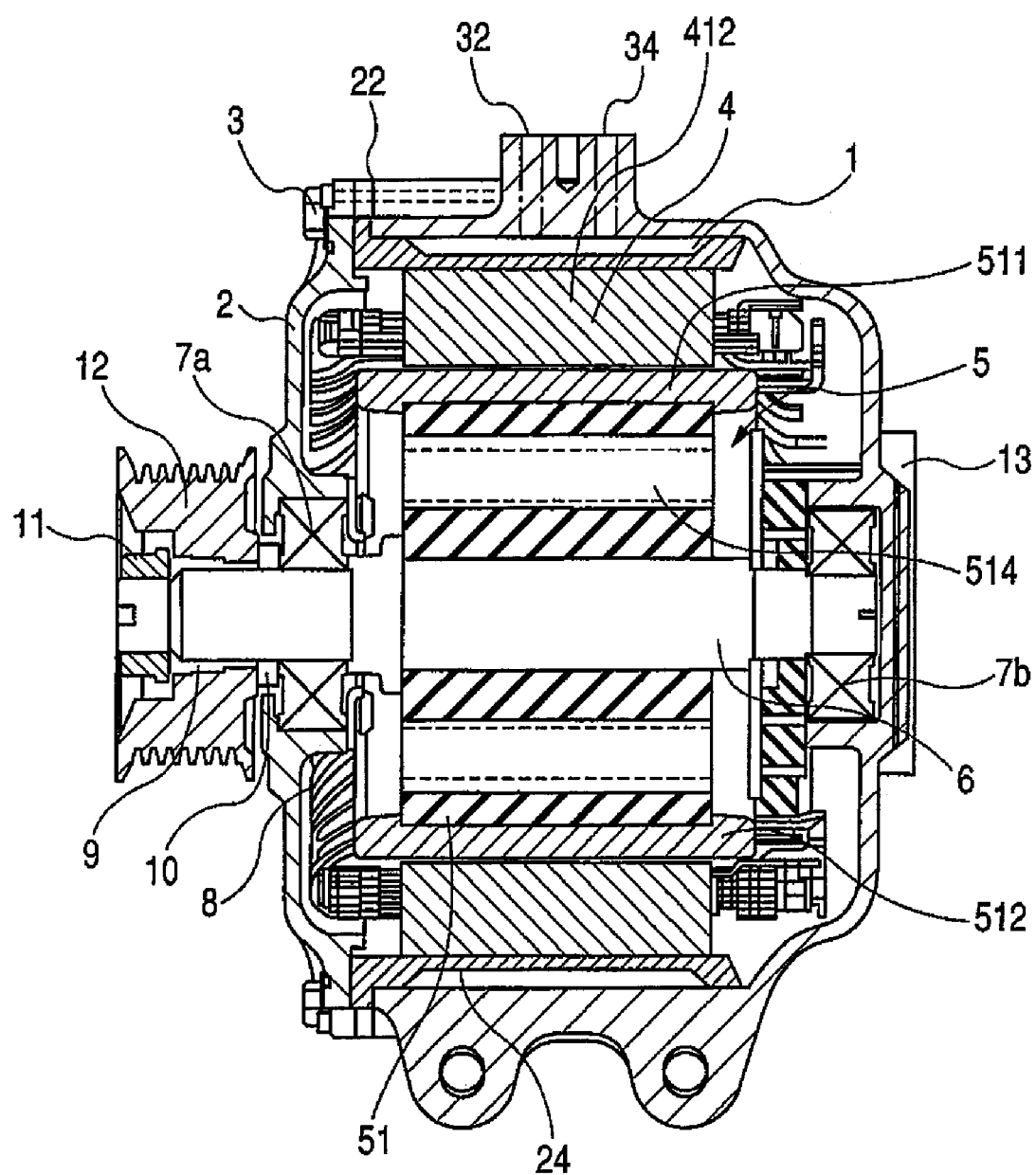
FIG. 1 is a sectional side view of a motor.

The electric rotating machinery to be described in the following embodiments is applied to motors, for example, for automotive. It can be obtained a relatively large output despite a relatively small size; besides, the productivity can also be improved. As the wire of the stator coil, there can be employed not only a round wire but also a square wire, whereby the percent occupancy within each slot can be improved and hence the efficiency of the rotating machinery is improved. In the conventional rotating machinery, if a square wire is used, there are many places to be connected electrically after insertion of the wire into each slot and thus there has been a problem in point of productivity. In the following embodiments continuous coils can be inserted into slots, so that the number of connected parts is small and the productivity is improved.

In the following embodiments, each of lap winding portions of continuous coils is constituted by a continuous wire. In the lap winding portions as coils, each of them is disposed so as to form a lap between one slot and another slot. In each lap winding portion as a coil, one side thereof is positioned at a radial inner side of one slot and another side thereof is positioned at a radial outer side of another slot, in such a manner that, at a coil end, a shift between the one side and another side of each lap winding portion is made from the inner to the outer side or from the outer to the inner side of the slots. With such an arrangement, the continuous coils are arranged regularly and therefore it is possible to increase the number of coil turns and suppress an increase in the number of connected parts against the increase of the number of coil turns. Moreover, even with the increase in the number of coil turns, it is possible to suppress an increase in size of the rotating machinery shape.

In the following embodiments, in each slot, there are arranged plural wires in the radial direction with respect to a rotational axis and one wire in the circumferential direction, namely a single row of wires is arranged for each slot in the radial direction. The wires are connected so as to permit an electric current to flow in the same phase and in the same direction through slots adjacent to each other in the circumferential direction. With such a stator winding arrangement, it is possible to provide rotating machinery of a structure permitting improvement of productivity. Moreover, the in-phase wires disposed in adjacent slots are connected in series and, with the series-connected in-phase wires as unit winding, connection of stator winding is done. Thereby, the stator winding is improved in electrical balance.

The stator coil described above is applicable to both a permanent magnet motor and an induction rotating machinery. In the following embodiments an eight-pole induction rotating machinery is an example of the case where the stator winding is applied to an induction rotating machinery. By using six or more poles, particularly eight or ten poles, of an induction rotating machinery it is possible to reduce the radial thickness of a magnetic circuit of a rotor yoke. If the number of poles is made larger, a lowering of efficiency will result in relation to rotor cage wires. In the case of a rotating machinery used in an automobile drive system, the number of poles is preferably six to ten, more preferably eight to ten, still more preferably eight. The rotating machinery used in an automobile drive system indicates a rotating machinery which generates torque for starting a stopped engine or for travel of the vehicle together with the engine start or only for travel of the vehicle.

A description will now be given on the basis of a motor used in a hybrid electric vehicle as an example of the rotating machinery in the present invention. A motor for a hybrid electric motor embodying the present invention possesses both a wheel driving motor function and a power generating generator function, which are switched from one to the other according to running conditions of the vehicle.

Figure 2:
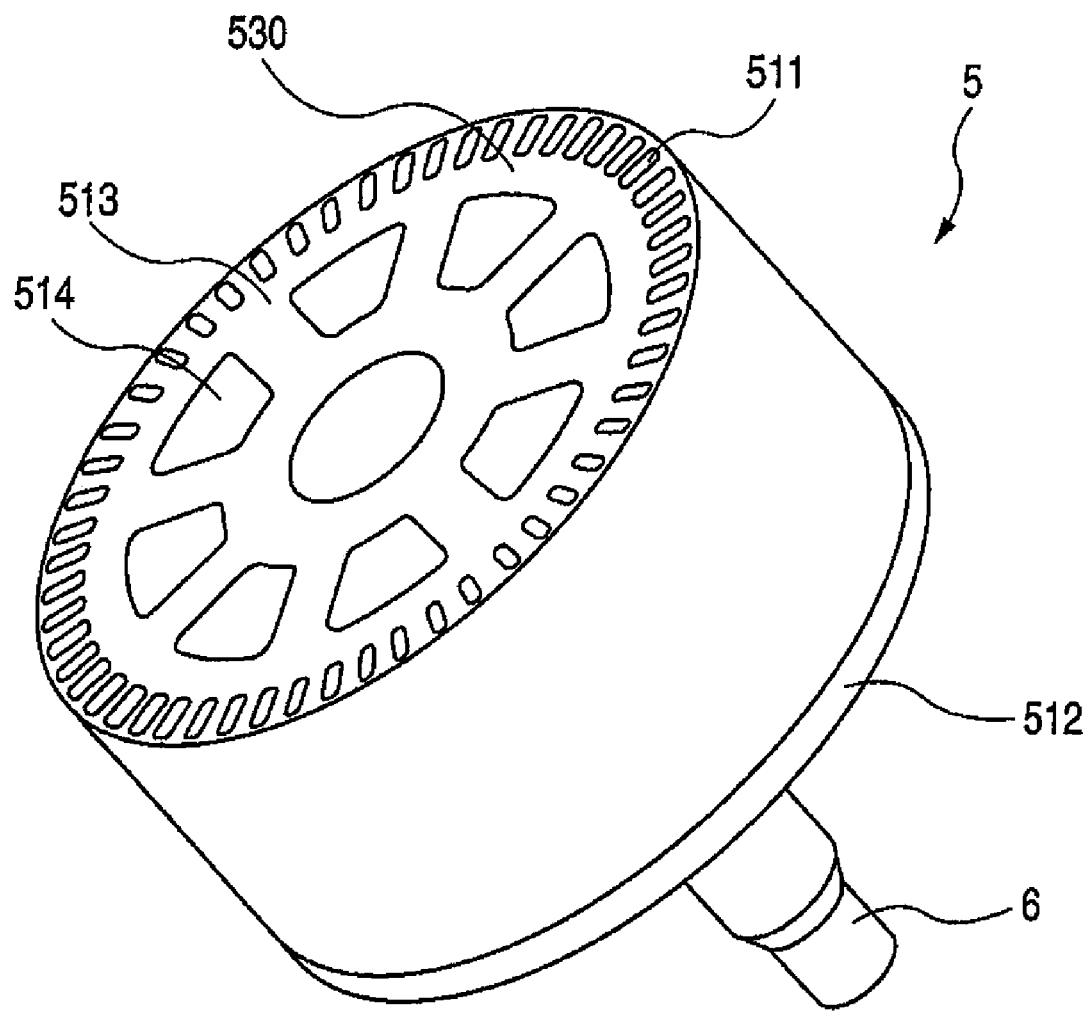
FIG. 2 is a perspective sectional view of a rotor.
Figure 3:
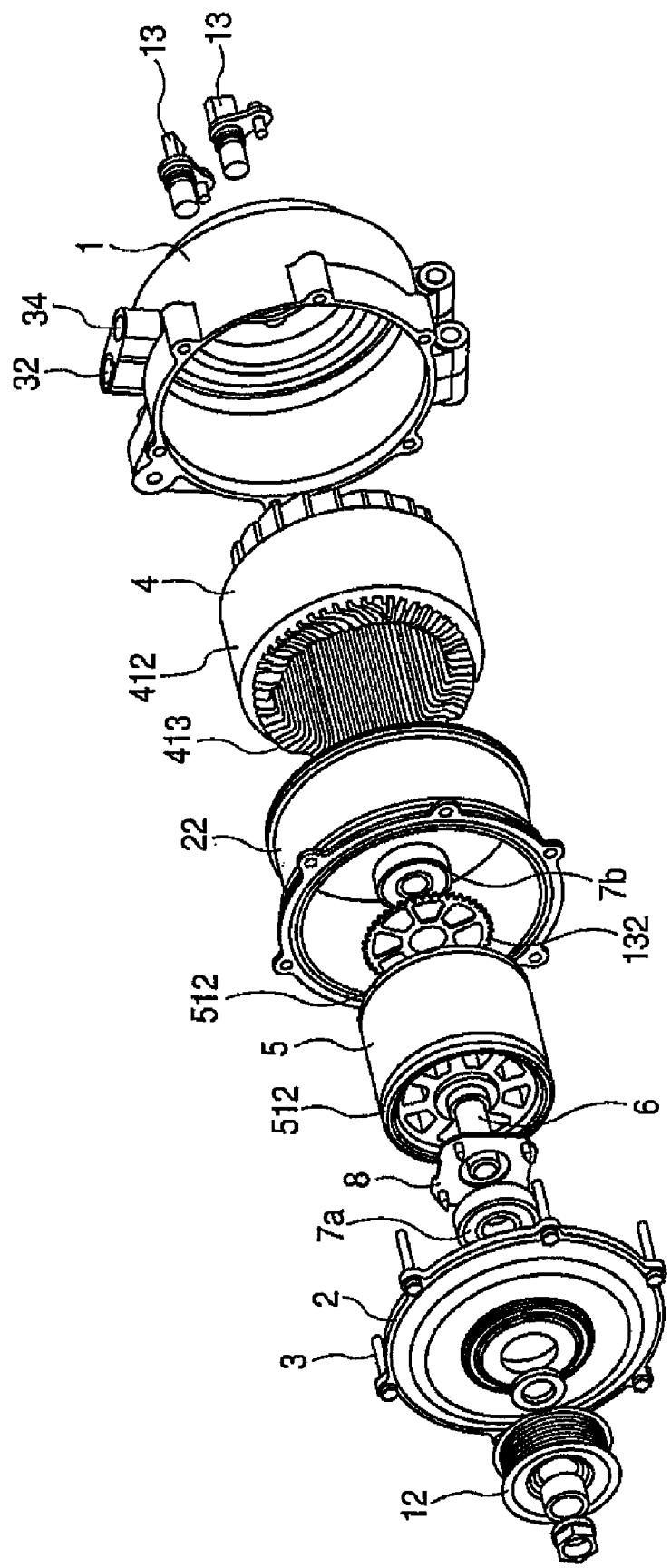
FIG. 3 is a perspective view of various parts in the motor.

The rotating machinery for a hybrid electric vehicle embodying the invention will be described with reference to drawings. FIG. 1 is a sectional side view of an induction rotating machinery, FIG. 2 is a perspective view showing a section of a rotor, and FIG. 3 is a developed perspective view of various parts associated with the induction rotating machinery.

The induction rotating machinery has a cylindrical housing 1 with an end wall, which is open at one end side opposite to the end wall in an axial direction and an end cover 2 which seals the open end of the housing 1. Inside the housing 1 is disposed a water channel-forming member 22. One end of the water channel-forming member 22 is fixed in a sandwiched state between the housing 1 and the end cover 2. Water channels 24 and 26 are formed between the stator 4 and the housing 1. A cooling water inlet 32 is formed to take cooling water into the water channel 24. The cooling water flows from the water channel 24 to the water channel 26 and is discharged from a discharge port 34 to cool the rotating machinery. The housing 1 and the end cover 2 are joined with plural, for example, six bolts 3.

The water channel-forming member 22 is provided on the inner periphery of the housing 1 and a stator 4 is fixed inside the water channel-forming member 22 by shrink fit for example. The stator 4 is made up of a stator core 412 having plural slots 411 formed circumferentially at equal pitches and a three-phase stator coil 413 wound with in the slots 411. In this embodiment, 8 poles and 48 slots are used and the stator coil 413 is connected by star connection and each phase is connected by 2Y connection with a pair of winding portions connected in parallel.

A rotor 5 is disposed rotatably inside the stator core 412 so as to face the stator core 412 with a small gap. The rotor 5 is fixed to a shaft 6 and rotates together with the shaft 6. The shaft 6 is supported rotatably by a pair of ball bearings 7a and 7b provided in the housing 1 and the end cover 2, respectively. The bearing 7a of the bearings 7a and 7b is installed on the end cover 2, and which is fixed by a generally square fixing plate 8 shown in FIG. 3. The bearing 7b is installed on the end wall of the housing 1, and which is fixed to a recess formed in the end wall of the housing 1. Therefore, the rotor 5 rotates relatively with respect to the stator 4 and a torque of the shaft 6 is outputted to the exterior by a pulley 12 which is mounted to the cover 2-side portion of the shaft 6 with a nut 11 through a sleeve 9 and a spacer 10. Alternatively, the torque is inputted to the shaft 6 from the pulley 12. The outer periphery of the sleeve 9 and the inner periphery of the pulley 12 are somewhat conical, so that the pulley 12 and the shaft 6 are united strongly with a clamping force of the nut 11, thus permitting integral rotation of the two.

The rotor 5 is a cage inductor motor type rotor having conductor bars 511 disposed in a circumference direction at equal pitches, and the conductor bars 511 extend in a rotational axis direction of the rotor. A pair of short-circuit rings 512 are mounted to the rotor 5 at both ends in the rotational axis direction so as to short-circuit among the conductor bars 511. The conductor bars 511 are embedded in a rotor core 513 formed of a magnetic material. FIG. 2 shows a sectional structure cut along a plane perpendicular to the rotational axis in order to clearly show the relation between the rotor core 513 and the conductor bars 511. The short-circuit ring 512 located on the pulley 12 side and the shaft 6 are not shown.

The rotor core 513 is formed by a lamination core obtained by punching or etching a magnetic steel sheet having a thickness of 0.05 to 0.35 mm and by subsequent lamination of such formed magnetic steel sheets. As shown in FIGS. 2 and 3, the rotor core 5 is provided with circumferentially inside-disposed sectorial cavities 514 and outside-disposed conductive bars 513 at equal pitches respectively. The sectorial cavities are for the reduction of weight of the rotor core. The conductive bars 513 are inserted into a plurality of insertion holes provided in the circumferential direction of the rotor core 5 at equal pitches. The rotor core 513 has the conductor bars 511 on the stator side and has a circular core portion 530 inside the conductor bars 511 to form a magnetic circuit. In this embodiment, the stator 8 has an eight-pole stator winding. In comparison with an induction motor having a two- or four-pole stator winding, it is possible to reduce the radial thickness of the magnetic circuit formed in the circular core portion 530. If the number of poles is increased to more than eight poles, it is possible to make the aforesaid thickness smaller, but if the number of poles is twelve or more, both output and efficiency of the rotating machinery may be lowered. Therefore, with the engine starting function also taken into account, the number of poles in the rotating machinery for vehicular traveling is preferably six to ten, more preferably eight or ten, poles.

The conductor bars 511 and the short-circuit rings 512 are each constructed of aluminum and are formed so as to become integral with the rotor core 513 by die casting. The short-circuit rings 512 at both ends of the rotor core are disposed so as to project to both axial ends from the stator core 513.

A sensing rotor 132 is disposed on the end wall side of the housing 1 and a rotation sensor 13 for sensing a rotational speed and a rotor position. The rotational sensor 13 senses teeth of the sensing rotor 132 to output an electric signal for sensing the position and rotational speed of the rotor 5.

Next, the operation of the induction motor according to this embodiment will be described with reference to FIGS. 1 to 3 and FIGS. 24 to 26.

Figure 24:
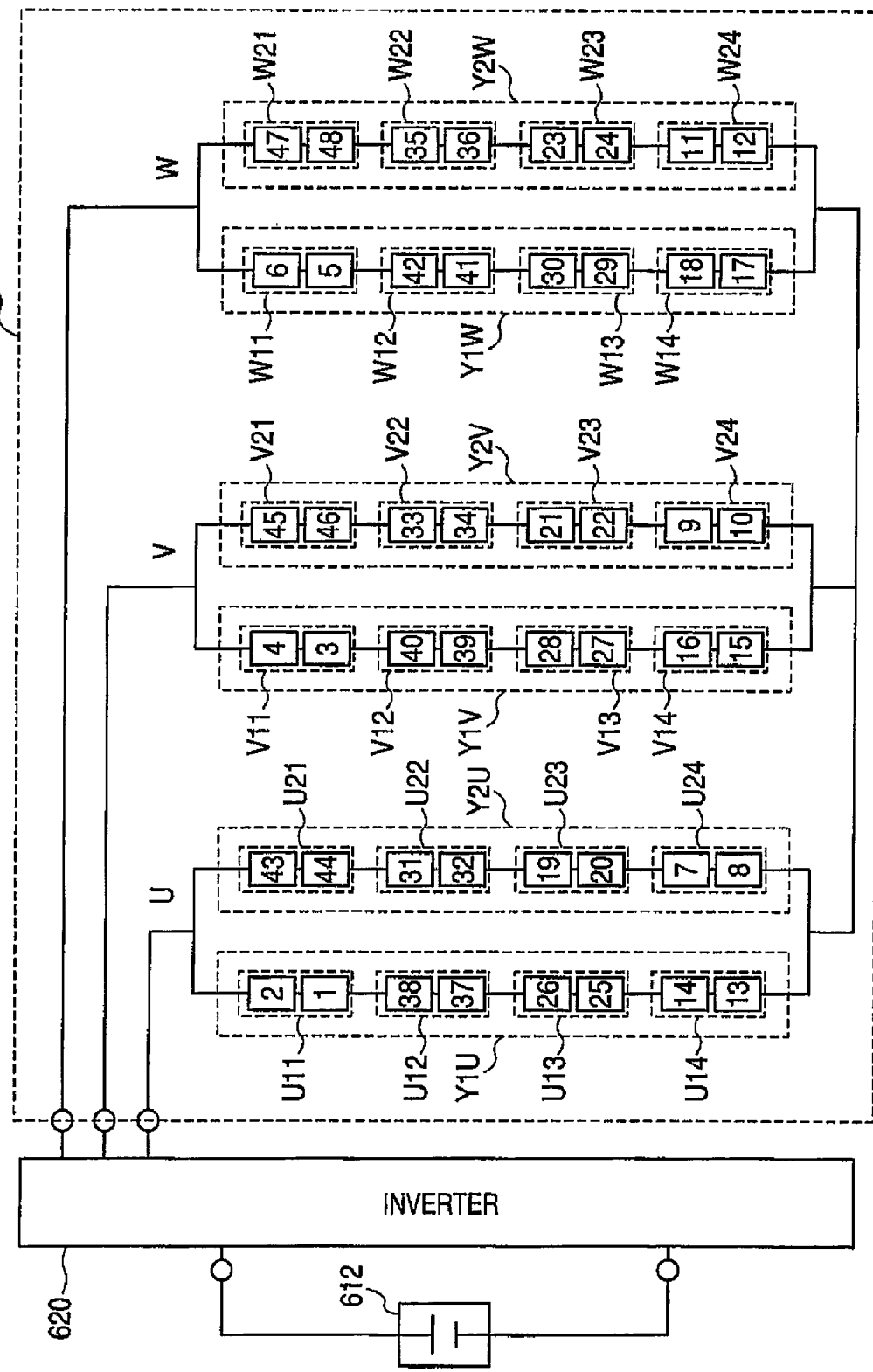
FIG. 24 is a connection diagram of a stator winding.
Figure 25:
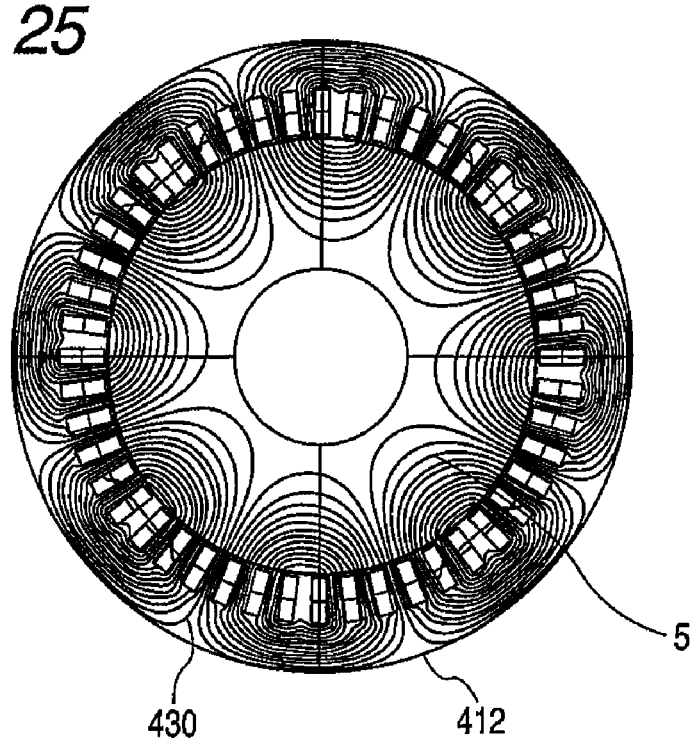
FIG. 25 is a diagram showing magnetic fluxes generated by the stator winding.

First, a description will be given about power running of the rotating machinery which functions as a wheel and engine driving motor. FIG. 24 illustrates a system for explaining an electrical connection, in which a secondary battery 612 for a high voltage corresponding to a voltage of, for example, 100V to 600V and DC terminals of an inverter 620 are connected together electrically. AC terminals of the inverter 620 are connected electrically to the stator coil 413. DC power is supplied from the secondary battery 612 to the inverter 620 and likewise AC power is supplied from the inverter to the three-phase stator coil 413 wound round the stator core 412. With the AC power, a rotating magnetic field of a rotational speed based on the frequency of the AC power is generated from the stator core 412. FIG. 25 shows the state of a rotating magnetic field generated by the stator coil 413. The stator coil 413 is an eight-pole distributed winding stator coil which will be described in concrete embodiments later. FIG. 25 shows a simulation result obtained in case of using imaginarily a conventional core not having conductor bars for the purpose of eliminating the influence of the rotor. A core back 430 is provided on the outer periphery side of slots in the stator core 412, forming a magnetic circuit of the above rotating magnetic field. In this simulation, since the number of poles of the stator winding is as larger as eight, it is possible to reduce the radial thickness of the magnetic circuit of the core back 430. The radial thickness of the magnetic circuit on the rotor 5 side is also small. The rotating magnetic field shown in FIG. 25 rotates on the basis of AC frequency fed to the stator coil 413.

In FIG. 24, the inverter generates an alternating current necessary for developing required torque and supplies it to the stator coil 413. In a state in which the rotational speed of the rotor 5 is low relative to the rotational speed of the rotating magnetic field, the conductor bars 511 have interlinkage to the rotating magnetic field generated in the stator core 412 and an electric current flows in the conductor bars 511 in accordance with Fleming's right-hand rule. As a result of the electric current flowing in the conductor bars 511, rotational torque occurs in the rotor 5, causing the rotor to rotate, in accordance with Fleming's left-hand rule. The difference between the rotational speed of the rotor 5 and that of the rotating magnetic field in the stator 4 exerts an influence on the magnitude of the above torque and therefore it is important to control the said speed difference, i.e., slip, in an appropriate manner. Therefore, the rotational position and speed of the rotor 5 are sensed on the basis of the output of the rotation sensor 13 and the switching frequency of the inverter is controlled to control the frequency of the alternating current supplied to the stator coil 413 of the stator.

Figure 26:
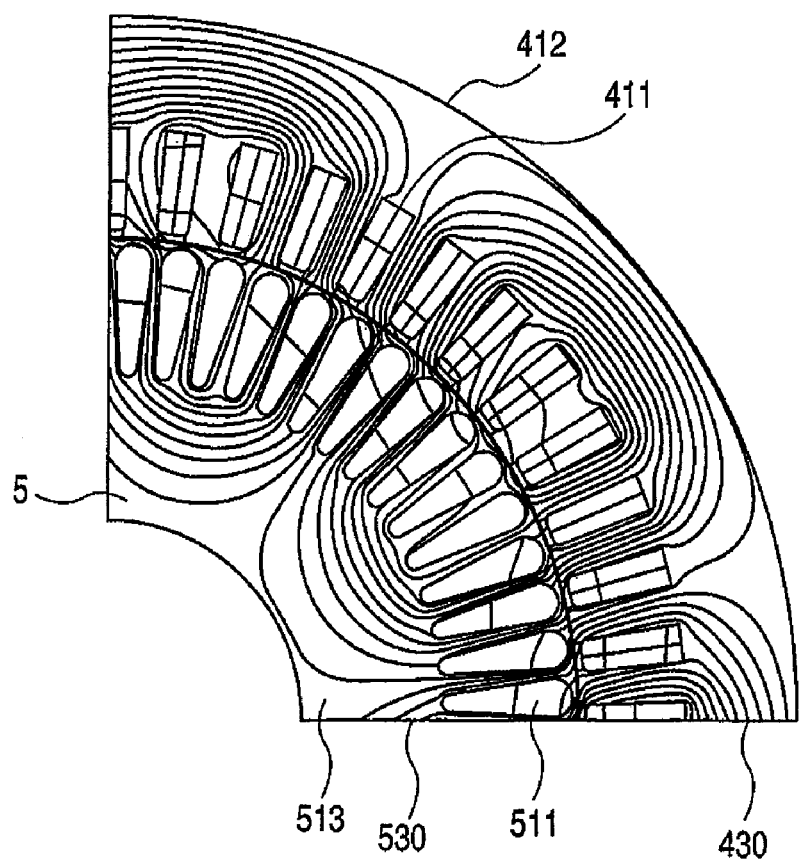
FIG. 26 is a diagram explaining magnetic fluxes in a power running state.

FIG. 26 is a simulation result showing the state of magnetic fluxes in the case where the rotational speed of the rotor 5 having the conductor bars 511 is lower than that of the rotating magnetic field created in the stator core 412. The rotational direction of the rotor 5 is the counterclockwise direction. A magnetic flux induced by the stator winding disposed in the slots 411 passes through the magnetic circuit including the core back 430 and the rotor yoke 530 of the rotor core 513. The magnetic flux of the rotor core 513 shifts to a delay side in the rotational direction of the rotor with respect to the magnetic flux of the stator core 412. Since the number of poles of the stator winding is as large as eight, the magnetic flux of the rotor yoke 530 is dense on the conductor bars 511 side and is coarse on the rotational axis side.

The following description is now provided about the case where the rotating machinery functions as a generator. When the rotating machinery functions as a generator, the rotational speed of the rotor 5 which rotates under the rotational force inputted from the pulley 12 is higher than that of the rotating magnetic field occurring in the stator core 412. When the rotational speed of the rotor 5 becomes higher than that of the rotating magnetic field, the conductor bars 511 have interlinkage to the rotating magnetic field, so that a braking force acts on the rotor 5. With this action, electric power is induced in the stator coil 413 and power generation is performed. In FIG. 24, if the frequency of the AC power generated by the inverter 620 is made low and the rotational speed of the rotating magnetic field occurring in the stator core 412 is made lower than that of the rotor 5, DC power is fed from the inverter 620 to the secondary battery 612. Since the electric power which the rotating machinery generates is based on the difference between the rotational speed of the rotating magnetic field and that of the rotating side of the rotor 5, it can be controlled by controlling the operation of the inverter. If loss and reactive power in the rotating machinery are ignored, then if the rotating magnetic field of the rotating machinery is made faster than the rotational speed of the rotor 5, electric power is fed from the secondary battery 612 to the rotating machinery via the inverter 620, so that the rotating machinery functions as a motor. If the rotating magnetic field of the rotating machinery is made equal to the rotational speed of the rotor 5, there is neither transmission nor reception of electric power between the secondary battery 612 and the rotating machinery. Further, if the rotating magnetic field of the rotating machinery is made slower than the rotational speed of the rotor 5, electric power is fed from the rotating machinery to the secondary battery 612 via the inverter 620. Actually, however, loss and reactive power in the rotating machinery are not ignorable, when the rotating magnetic field of the rotating machinery is somewhat slower than the rotational speed of the rotor 5, there no longer is any supply of electric power from the secondary battery 612 to the rotating machinery.

[First Embodiment]

Figure 4:
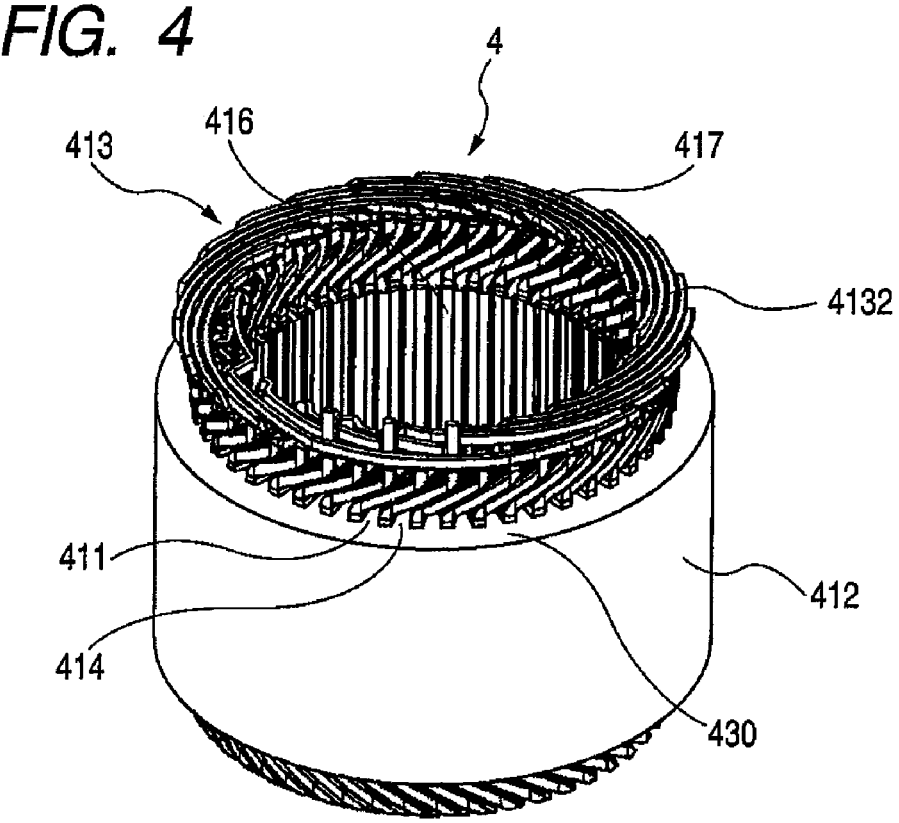
FIG. 4 is a perspective view of a stator according to a first embodiment of the present invention.
Figure 5:
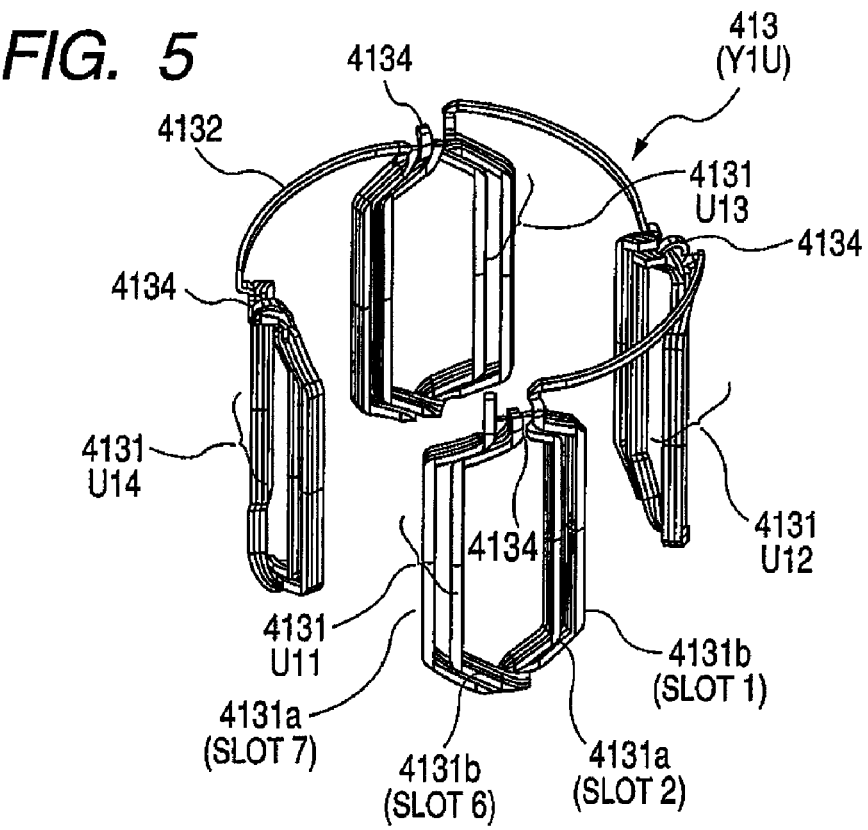
FIG. 5 is a perspective view of a rotor winding in the first embodiment.
Figure 6:
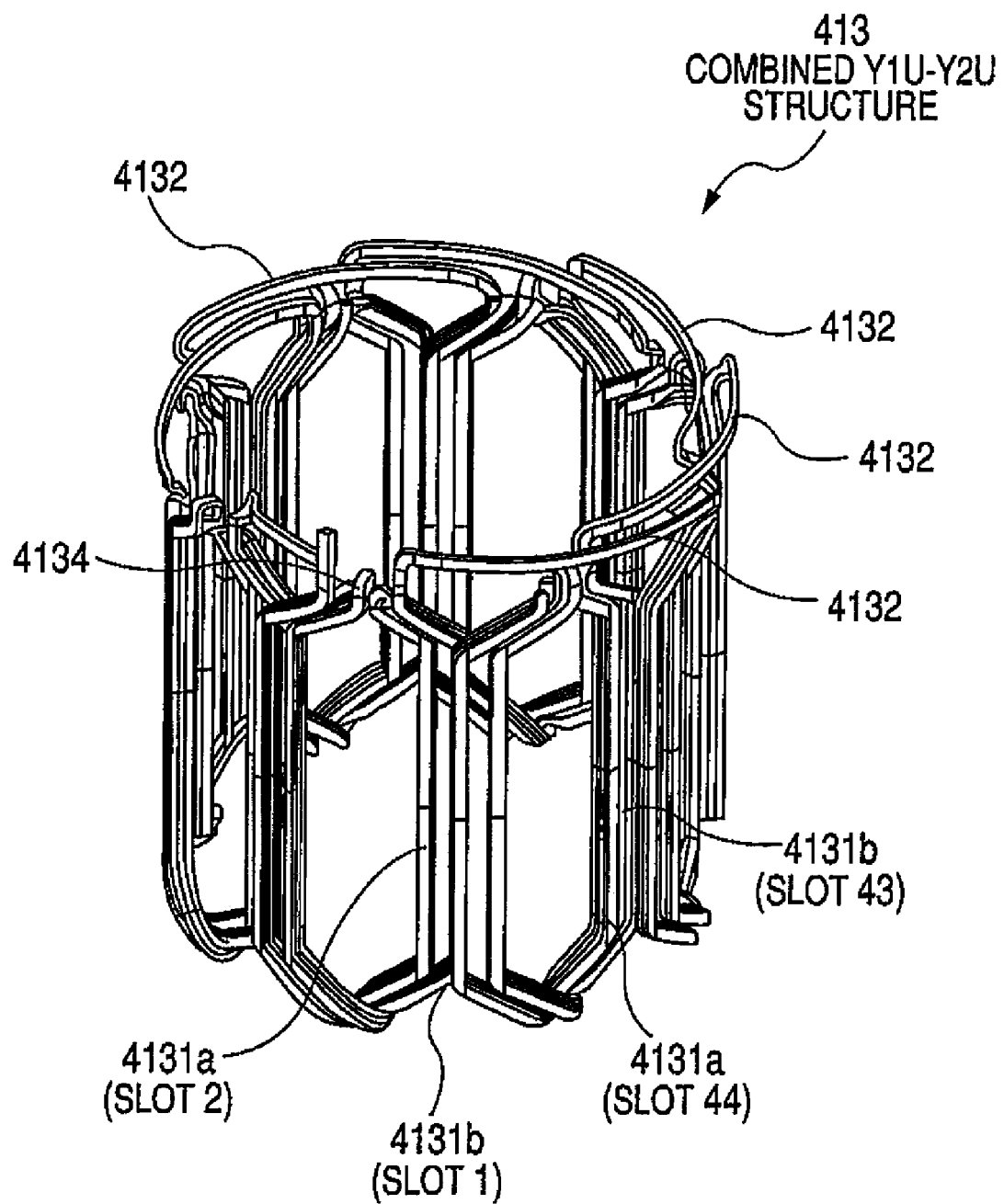
FIG. 6 is a perspective view of a rotor winding of one phase in the first embodiment.
Figure 7:
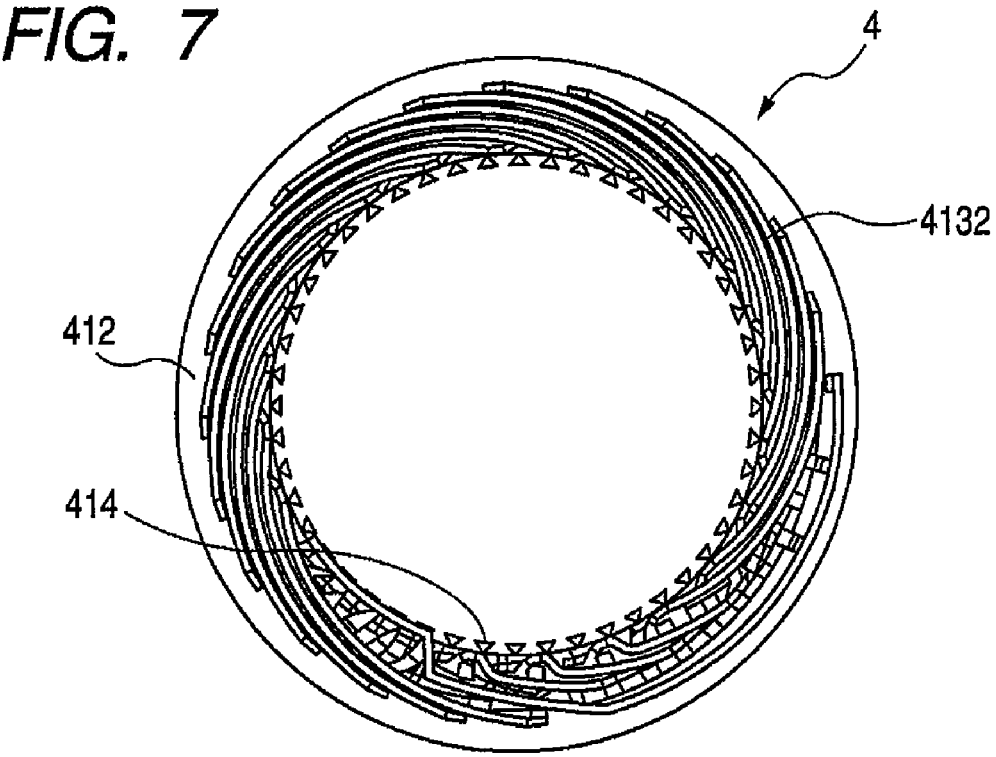
FIG. 7 is a front view of the stator of the first embodiment.
Figure 8:
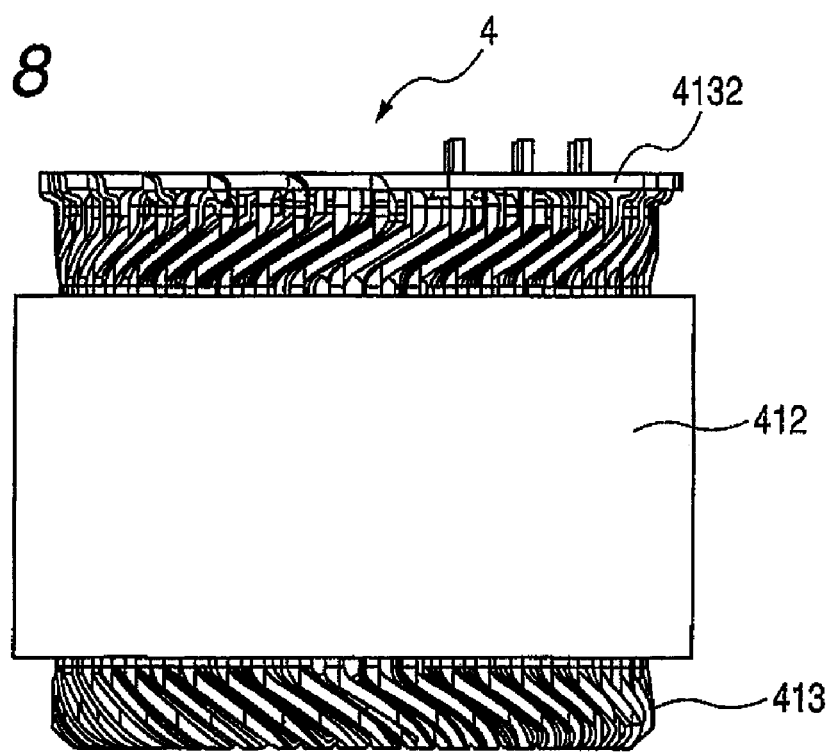
FIG. 8 is a side view thereof.
Figure 19:
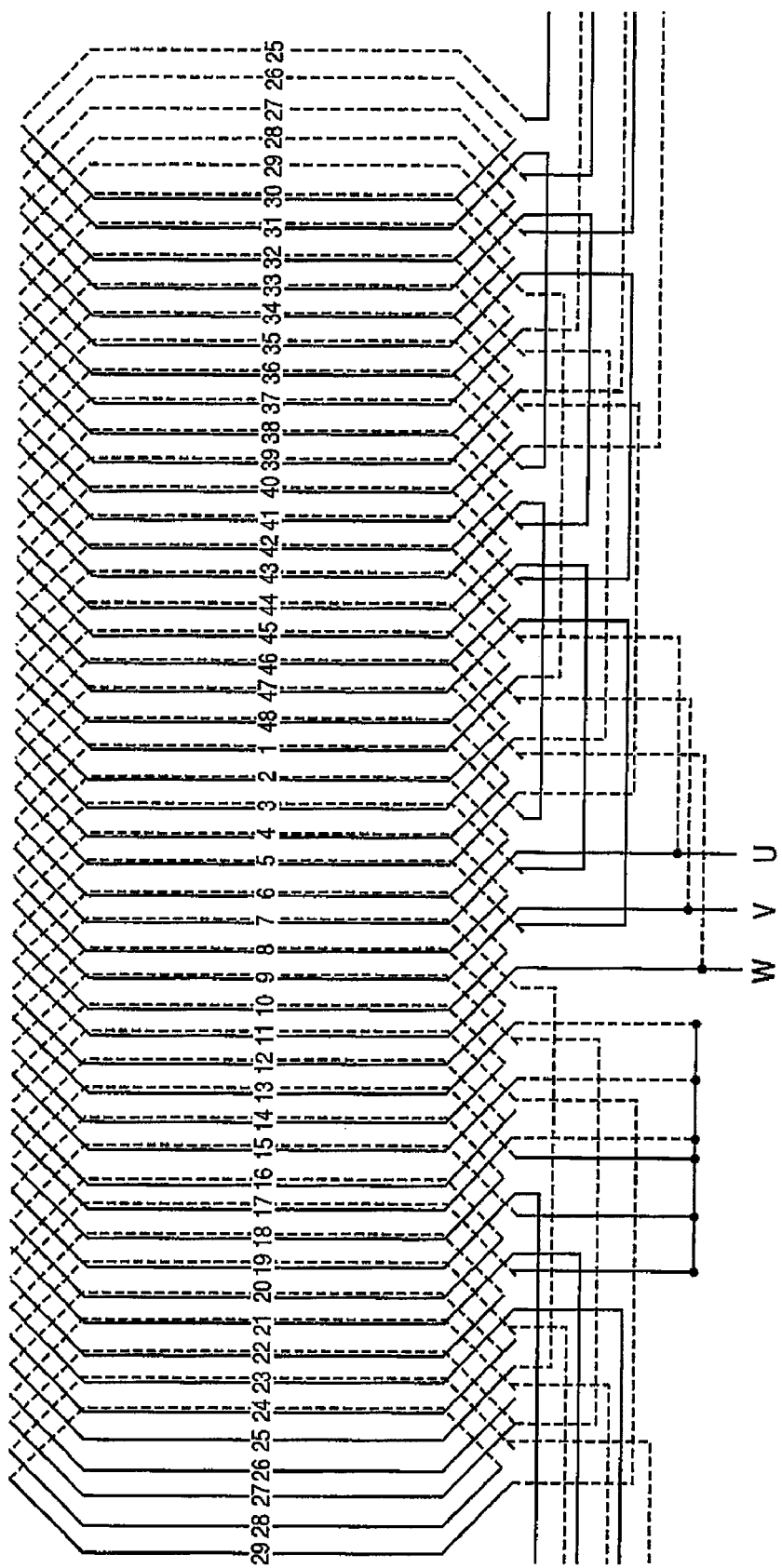
FIG. 19 is a wire connection diagram of the stator winding.
Figure 27:
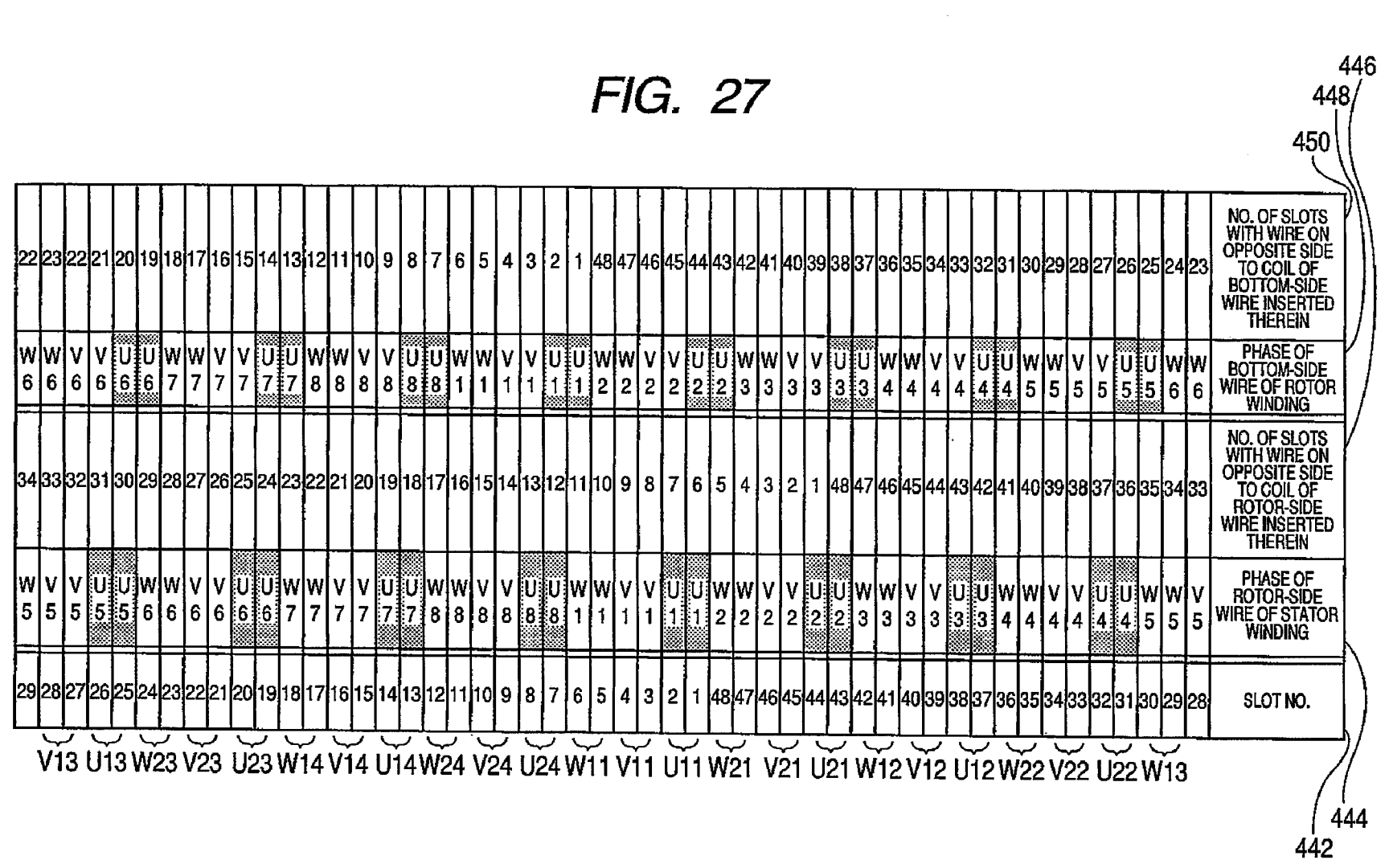

Now, with reference to FIGS. 4 to 8 and FIGS. 19, 24, 27, a description will be given about the details of a stator according to a first embodiment of the present invention. FIG. 4 is a perspective view of the stator of this first embodiment, FIG. 5 is a perspective view of a single continuous coil for constituting a stator coil, FIG. 6 is a perspective view of a coil for one phase, FIG. 7 is a front view of the stator of this first embodiment, FIG. 8 is a side view thereof, FIG. 19 is a wire connection diagram, FIG. 24 is a connection diagram of a stator coil 413, and FIG. 27 illustrates a relation between the slot number in the stator and coils as constituents of a stator coil.

A stator 4 shown in FIG. 4 includes a stator core 412 having forty-eight slots 411 formed circumferentially at equal pitches and a stator coil 413 wound round the slots 411. The stator core 412 is constituted by a lamination core formed, for example, by punching or etching a magnetic steel sheet of 0.05 to 0.35 mm in thickness and then laminating the thus-formed magnetic steel sheets. In the circumferential direction of the stator 4, there are plural slots 411 arranged radially at equal pitches. In this embodiment, the number of the slots is forty-eight. Teeth 414 are provided between the slots 411 and each of the teeth 414 is integral with an annular core back 430. That is, the teeth 414 and the core back 430 are formed by integral molding. The slots 411 are open on their inner periphery side and constituent coils of the stator coil 413 are inserted from those openings. The slots are each formed so that the circumferential width of each of the openings is almost equal to or a little larger than the coil loading portion of each slot. A holding member 416 is attached to a tip end side of each of the teeth 414 to prevent movement to the inner periphery side of the coil. The holding member 416 is formed of a non-magnetic material such as resin or a non-magnetic metal material and is axially fitted into a holding groove 417 which is formed in each of both side faces in the circumferential direction on the tip end side of each of the teeth 414 so as to extend axially.

Next, a description will be given about the stator coil 413 with reference to FIGS. 5 and 6. The stator coil 413 used in this embodiment is a three-phase stator coil. First, reference will be made to one of the three phases. The stator coil 413 of this embodiment uses a wire called as square wire having a generally square sectional shape and coated on the outer periphery with an insulating film. A square sectional shape of the wire in a wound state is such that the wire is long in the circumferential direction and short in the radial direction of the stator core 412. As noted above, the wire surface of the stator coil 413 is coated for insulation.

Before describing FIG. 5, the wire connection of the stator coil 413 will be described with reference to FIG. 24. In this embodiment, the stator coil 413 has two star connections. Assuming that the two star connections are Y1 connection and Y2 connection, the Y1 connection has a U phase winding Y1U, a V phase winding Y1V and a W phase winding Y1W, while the Y2 connection has a U phase winding Y2U, a V phase winding Y2V and a W phase winding Y2W. The Y1 and Y2 connections are connected in parallel with each other and respective neutral points are also connected with each other.

The winding Y1U is composed of series-connected coils U11, U12, U13 and U14. The winding Y2U is composed of series-connected coils U21, U22, U23 and U24. The winding Y1V is composed of series-connected coils V11, V12, V13 and V14. The winding Y2V is composed of series-connected coils V21, V22, V23 and V24. The winding Y1W is composed of series-connected coils W11, W12, W13 and W14. The winding Y2W is composed of series-connected coils W21, W22, W23 and W24. As shown in FIG. 24, the coils U11 to W24 each have further two sets of coils. For example, the coil U11 is constituted by series-connected coils 2 and 1. The numerals of the coils 2 and 1 represent rotor-side slot numbers with coils inserted therein. That is, the coil U11 is a series connection of slot No. 2 coil and slot No. 1 coil. Likewise, the coil U12 is a series connection of slot No. 38 coil and slot No. 37 coil. In this way, the coil numbers shown in FIG. 24 represent rotor-side slot numbers with coils inserted therein. The last coil W24 is a series connection of slot No. 11 coil and slot No. 12 coil. It is to be noted that in each set of series-connected coils the coils are inserted into adjacent slots. As will be described later, this layout facilitates manufacture and is effective in reducing torque pulsation. As to in what state each of the above coils is wound, it will be described in detail later.

The windings Y1U, Y1V, Y1W, Y2U, Y2V and Y2W are of the same structure and therefore the winding Y1U will be described below as a typical example with reference to FIG. 5.

The structure of the stator coil 413 will now be described with reference to the winding Y1U as a typical example. The winding Y1U is composed of series-connected coils U11, U12, U13 and U14. The coils are arranged at equal pitches and hence arranged at 90° pitches in terms of a mechanical angle. The coil U11 has two coils 4131a and 4131b. The coil 4131a has a structure of a lap winding, for example laps having three turns in this embodiment, through the rotor side (inner side) of the slot 2 and the bottom side (outer side) of the slot 7. Namely, the coil 4131a forms plural laps (lap winding) between a pair of slots 2 and 7. Since the lap winding structure of the coil between (through) the pair of slots is realized by using a single continuous wire, it is not necessary to perform a connecting work for the winding coil U11.

The coil 4131b as a constituent of the coil U11 has also a structure of a lap winding, for examples three turns, between the rotor side of the slot 1 and the bottom side of the slot 6. Namely, the coils 4131a and 4131b have each plural lap winding structure for winding between two slots, and one half (one side) of each lap winding is disposed on the rotor side (inner side) of one slot, while the other half (the other side) is disposed on the bottom side (outer side) of the other slot. The coils 4131a and 4131b are connected in series by a coil-to-coil extending line 4134. This series-connected portion is also constituted by a continuous wire, requiring no special connecting work. The coil 4131 as a winding portion between the two slots is in a hexagonal shape when loaded to the stator coil 412 and is wound with the lap winding structure. Each coil end of the coil 4131 acts as crossover wire between the one side part of the lap winding of the inner periphery side as the rotor side in one slot and the other side part of the lap winding of the outer periphery side as the bottom side in the other slot. The spacing between the slot 2 as one slot and the slot 7 or 6 as the other slot is based on lap winding which is determined on the basis of the number of slots and the number of poles.

As described above, the coils 4131a and 4131b with the lap winding structure are formed by a continuous wire. Further, according to the following method, not only the two coils 4131a and 4131b but also the coil-to-coil extending line 4134 which connects the two coils with each other can also be formed using a continuous wire. In this embodiment, therefore, although the number of returns in the stator winding increases, an increase in the number of connected parts is prevented.

As noted above, two coils 4131a and 4131b are used in a pair and one set is constituted with four pairs; and the four pairs of one set are arranged at four positions of the stator core at predetermined pitches, for example at equal 90° pitches in a circumferential direction of the stator in this embodiment. In plural pairs (four pairs : one set) of coils 4131a and 4131b, a lead wire portion extending from the inner periphery side of a winding portion with the lap winding structure in one pair and a lead wire portion extending from the outer periphery side of a winding portion with the lap winding structure in other pair are connected at respective tops at coil ends via a crossover connecting wire 4132. In this embodiment, the stator coil is made in such a manner that the lead wire extending from the inner periphery side of the winding portion in the one pair of coils (4131*a*, 4131*b*) and the lead wire extending from the outer periphery side of the winding portion in the other pair of coils (4131*a*, 4131*b*) set of the other winding portion are continuous to those winding portions. Thus, the sets of four pairs of coils (4131*a*, 4131*b*) in which each pair of coils are formed adjacent to each other, are formed a single continuous wire. The crossover connecting wires 4132 are provided on only one axial end side of the stator 4 and they are concentrated so as to cross from the outer to the inner periphery side of the stator core 412.

The one set of coils shown in FIG. 5 is a half of one-phase stator winding. The stator winding which constitutes one phase is disposed such that the winding Y2U, which has the same structure as that of the winding Y1U described above in FIG. 5, is 45° offset in terms of a mechanical angle relative to the winding Y1U in the circumferential direction, as shown in FIG. 6. That is, each pair of coils 4131*a* and 4131*b* in a set of coils (winding Y2U) formed in the same manner as the winding Y1U is disposed in 45° shifted manner in terms of a mechanical angle relative to the winding Y1U. The coil 4131*a* which constitutes the coil U11 is disposed on the rotor side of the slot 2. The coil 4131*b* which constitutes the coil U11 is disposed on the rotor side of the slot 1. The coil 4131*a*, which constitutes the coil U21 shifted by 45° in mechanical angle, has a lap winding structure which forms plural laps between the rotor side of a slot 44 and the bottom side of the slot 1. The coil 4131*b*, which constitutes the coil U21, has a lap winding structure which forms plural laps between the rotor side of a slot 43 and the bottom side of a slot 48.

The stator coil 413 corresponding to three-phase coil is made by disposing the stator windings as a coil assembly, as shown in FIG. 6, in shifted states of a 15° and 30° in the circumferential direction. Thus, in this embodiment, the stator coil 413 for three phases can be wound round the stator core 412 in a reduced number of connected parts. As shown in FIG. 7, the portion of the crossover connecting wire 4132 in each coil is disposed so as to make a crossover between the outer periphery side and the inner periphery side of the stator core 412 and therefore, as a whole, the crossover connecting wire 4132 is formed in a stream line close to a generally scroll shape. As to each of neutral points in the star connection, the crossover connecting wire 4132 is not a continuous wire and it is necessary that an end of each coil and a separately provided crossover connecting wire be connected together by welding for example. The crossover connecting wire serving as a neutral point is also disposed so as to straddle the outer periphery side and the inner periphery side of the stator core 412. With such a structure, the stator winding is disposed in a regular structure and thus the space is utilized efficiently, with the result that it becomes possible to reduce the size of the rotating machinery.

FIG. 27 illustrates a layout relation between slots and coils which constitute the stator coil 413. In the same figure, the column 442 represents No. of slots. More specifically, with a predetermined slot as a reference, forty-eight slots are numbered in order from the reference slot. In the coil U11 to W24 as a constituent of the stator coil 413 in FIG. 24, they are constituted by a coil indicated with slot Nos. disposed on the rotor side. The construction is shown below the column 442 in relation to slots. In the column 442, coil W13 comprises slot Nos. 29 and 30. This indicates that the coil W13 is constituted by a series connection of a rotor-side coil of slot No. 29 and a rotor-side coil of slot No. 30. This is also true of coil Nos. 29 and 30 which constitute the coil W13 in FIG. 24. In the column 442 in FIG. 27, the coil U22 comprises slot Nos. 31 and 32. It is shown that the coil U22 is constituted by a series connection of a rotor-side coil of slot No. 31 and a rotor-side coil of slot No. 32. This is also true of coil Nos. 31 and 32 which constitute the coil U22 in FIG. 24. A look at the coil U22 in FIG. 24 shows that the associated slot numbers are 31 and 32. A look at the coil U11 described above in connection with FIG. 5 shows that the associated coil numbers are coil Nos. 1 and 2. This indicates that the coil U11 is constituted by a series connection of a rotor-side coil of slot No. 1 and a rotor-side coil of slot No. 2. This is also seen from the fact that coil Nos. 1 and 2 constitute the coil U11 in FIG. 24.

In FIG. 27, the column 444 represents the phase of the stator winding and a layout order in that phase. In the column 442, the coil U11 comprises slot Nos. 1 and 2. As noted above, this indicates that the coil U11 is constituted by a series connection of coils disposed in slot Nos. 1 and 2. The constituent coils of U11 are both described as "U1" in the column 444. This indicates that the coils are disposed in the first layout of U phase, i.e., in a reference position of U phase, in the stator winding. As to constituent coils of U21, both are described as "U2" in the column 444. This indicates that the coil U21 is disposed at a 45° position in terms of a mechanical angle from the second position of U phase, namely, from the reference position of U phase, in the stator winding. Likewise, the constituent coils of U12 are both described as "U3" in the column 444. This indicates that the coil U12 is disposed at a 90° position in mechanical angle from the third position of U phase, namely, from the reference position of U phase, in the stator winding. This is as already explained above in connection with FIG. 5.

Coil V11 is shifted by 15° in mechanical angle relative to coil U11. Therefore, coil V21 comprising "V2" in the column 444 is shifted by 45° in mechanical angle relative to the coil V11 which is shifted by 15° relative to the coil U11. Since all of V phase coils are shifted based on the coil V11, they are 15° shifted relative to U phase coils. Likewise, since coil W11 is shifted by 30° in mechanical angle relative to U phase coils from the position of the coil U11, all the W phase coils are 30° shifted relative to the U phase coils.

The following description is now provided about column 446. In this embodiment, the winding coil 4131 is wound through two slots to form lap winding. More specifically, the coil 4131*a* shown in FIG. 5 is wound through the slots 2 and 7. One slot where one side of the coil 4131*a* is located on the rotor side (open side of the slot) is No. 2, while the other slot where the other side of the coil 4131*a* is located on the bottom side of the slot is No. 7. The column 442 corresponds to the one slot number, and the column 446 corresponds to the other slot number. That is, the column 446 corresponding to slot No. 2 is "7". This indicates that the coil is wound through slot No. 2 as one slot and slot No. 7 as the other slot. Likewise, the columns 442 and 446 indicate one and the other slot of the winding coil.

Column 448 represents the phase of a coil positioned in the bottom side of the slot corresponding to slot numbers shown in the column 442 and a layout order of the coil in that phase. Column 450 represents slots for winding therein of the coils described in the column 448. For example, it is shown therein that a coil positioned in the bottom side of the slot corresponding to slot No. 2 in the column 442 is the coil located at the second position of V phase. The numeral "45" in the column 450 indicates that the coil disposed in the bottom side of slot No. 2 is wound through two slots where one of which is slot No. "45" and the other is slot No. "2." When looking at slot No. 45 in the column 442, therein it shows that it corresponds to "2" in the column 446. This description indicates the same coil as above. That is, it shows that the coil winding through one slot No. "45" and the other slot No. 2 is the coil disposed at the second position of V phase.

In the structure described above in connection with FIGS. 24 and 27, plural wires are arranged in a radial direction in each slot, forming a coil of a shape where those wires wind through two slots. The winding coil is constituted by a continuous wire, so in this embodiment an increase in the number of connected parts is prevented although the number of turns increases. Besides, the winding coil is disposed in only a single row in each slot. As will be described below, this structure permits easy manufacture. Moreover, since wires are of a shape which is wide in the circumferential direction and thin in the radial direction, an eddy current generated in the intra-slot wires by leakage flux is suppressed. Consequently, the efficiency of the rotating machinery is improved and the generation of heat is suppressed.

As shown in FIG. 8, since the portion of each crossover connecting wire 4132 is positioned substantially on the same plane on one axial side of the stator 4, it is possible to shorten the coil end as far as possible. In this embodiment, as described above, the crossover connecting wire is disposed outside the coil end in the rotational direction. Thus an orderly layout is ensured as a whole and the whole of the rotating machinery is reduced in size. Also in point of electrical insulation it is possible to ensure reliability. Particularly, rotating machineries for driving automobiles use a high voltage and there are included many rotating machineries which use a voltage exceeding 100V. As the case may be, 400V or 600V is applied. Thus, the wire-to-wire reliability of the stator winding is important.

Moreover, in the above embodiment the coil 4131a having plural turns and the coil 4131b also having plural turns are connected together using the coil-to-coil extending line 4134. Outside the coil-to-coil extending line 4134 is disposed the crossover connecting wires, affording an orderly layout as a whole. As noted above, a reduction in size of the entire rotating machinery results. Further, reliability can be ensured also in point of electrical insulation.

Figure 11:
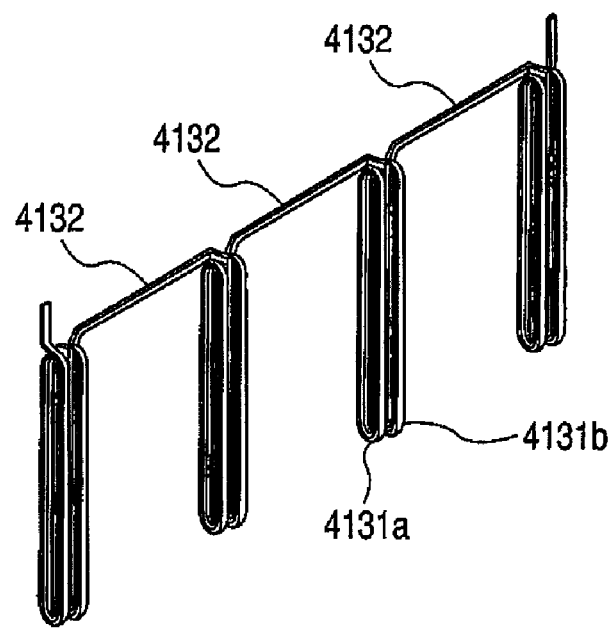
FIG. 11 is a perspective view of preformed coils.
Figure 12:
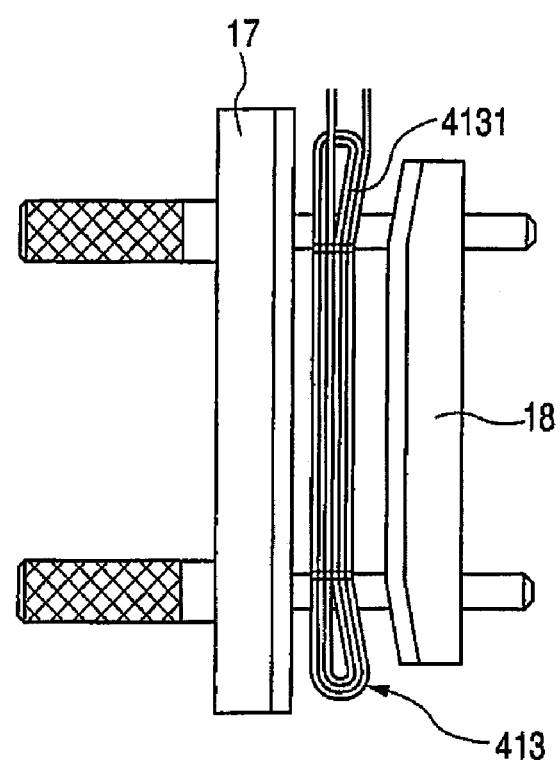
FIG. 12 is a side view showing a deformed state of a preformed coil.
Figure 13:
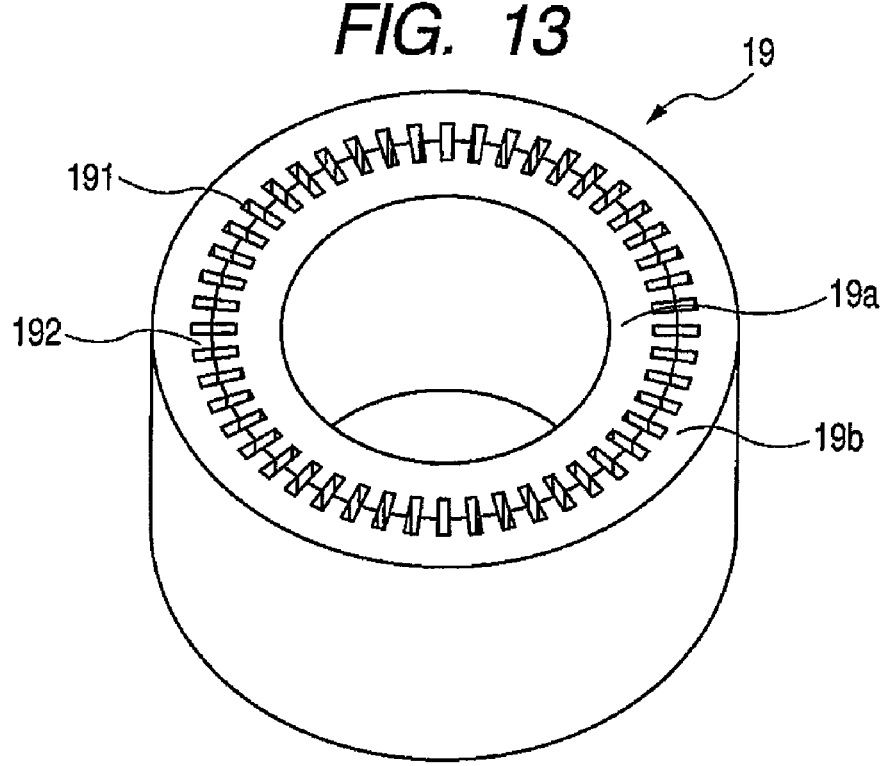
FIG. 13 is a perspective view of a coil forming jig.
Figure 14:
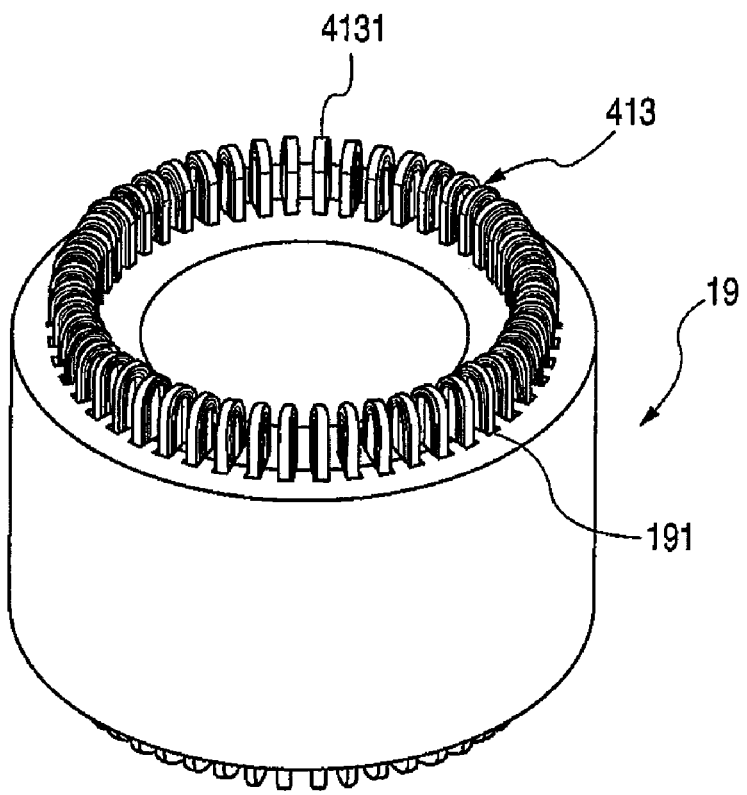
FIG. 14 is a perspective view showing a loaded state of the preformed coils into the coil forming jig.
Figure 15:
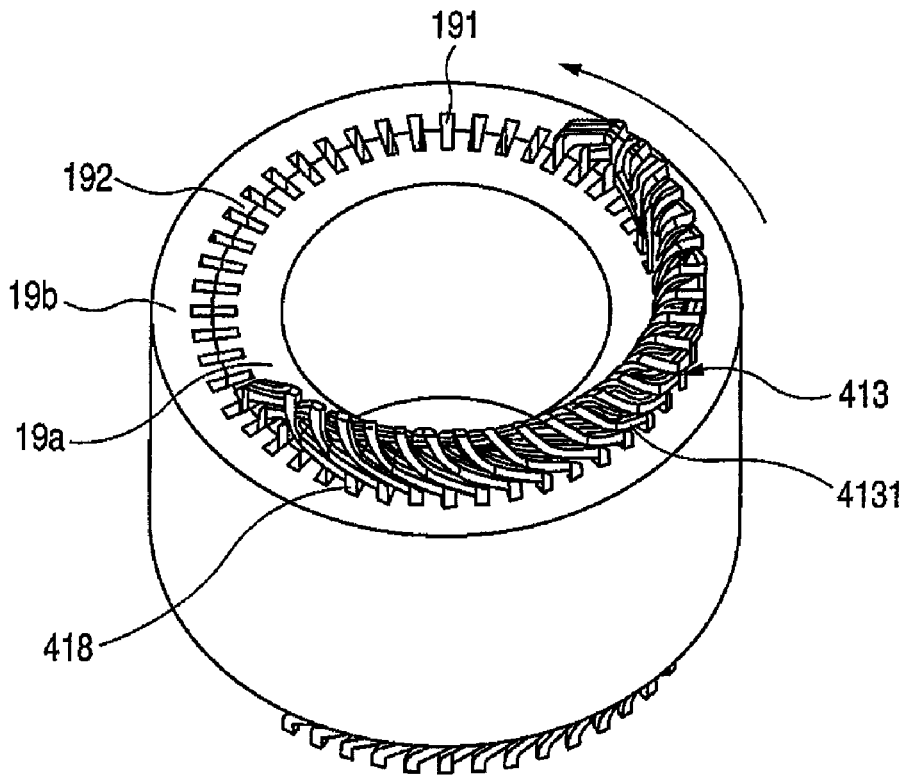
FIG. 15 is a perspective view showing a formed state of winding portions into a hexagonal shape.
Figure 16:
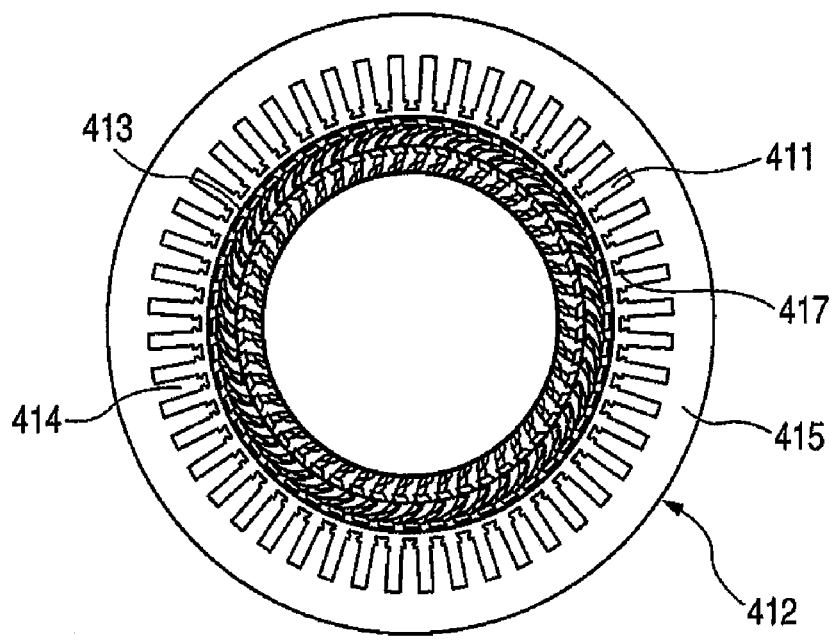
FIG. 16 is a front view showing a state in which the formed coils are arranged along the inner periphery of a stator core.
Figure 17:
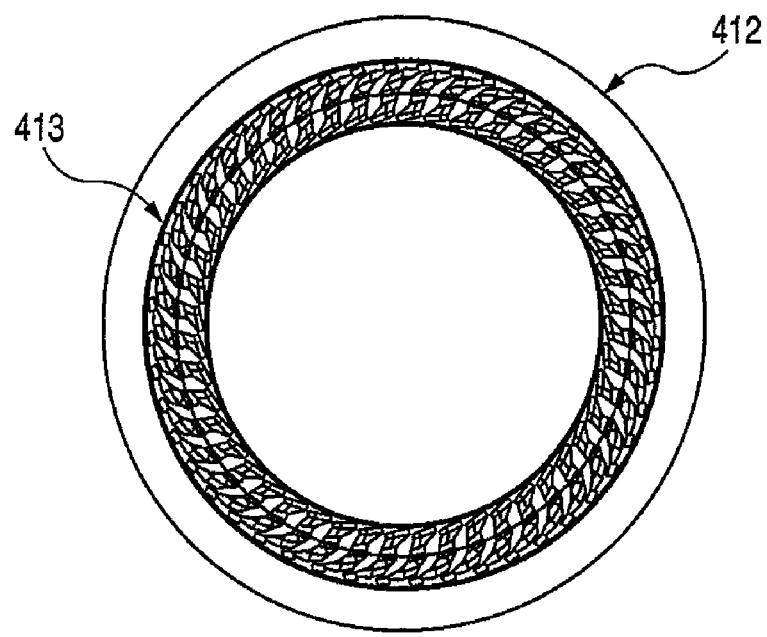
FIG. 17 is a front view showing a state in which the formed coils are inserted into slots of the stator core.
Figure 18:
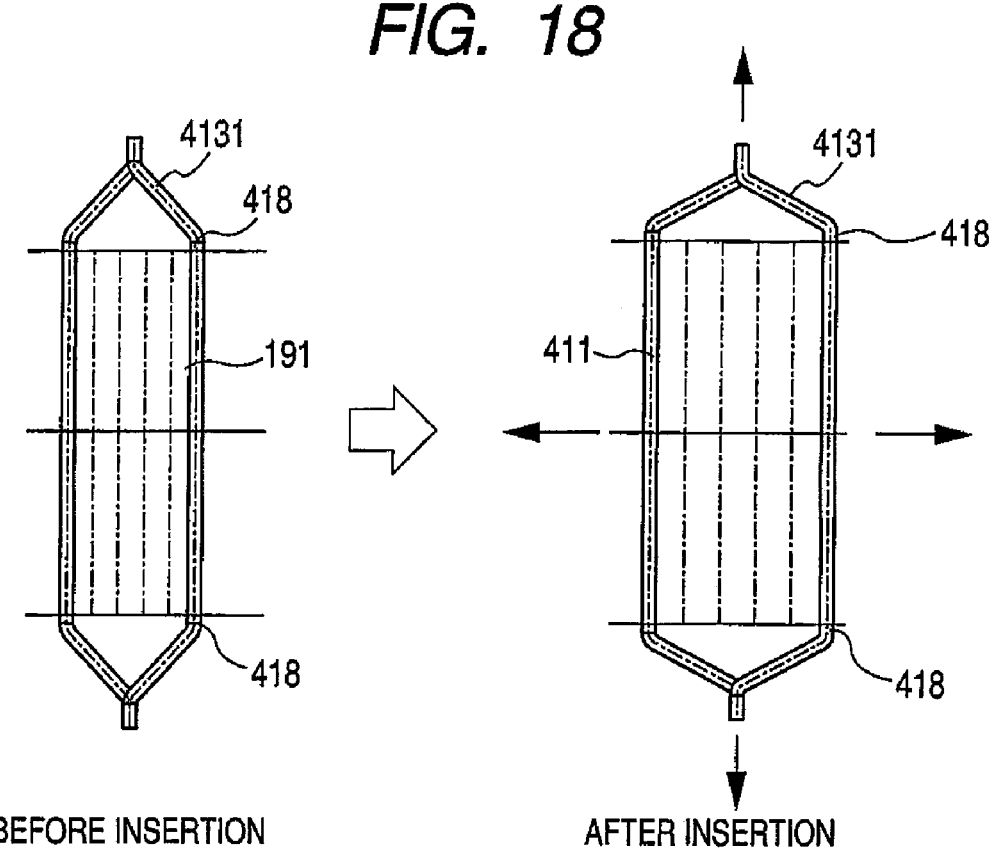
FIG. 18 is a side view showing a comparison between the hexagonal shape before insertion of coil into a slot and that after insertion into a slot.

Next, with reference to FIGS. 9A to 19, a description will be given about a method of winding coils into slots. FIG. 9A is a perspective view showing a wound state of coils on a winding form. FIG. 9B is an enlarged view of the portion (B) shown in FIG. 9A. FIG. 10 is a perspective view showing a state in which the coils on the winding form are further subjected to pressing. FIG. 11 is a perspective view of preformed coils. FIG. 12 is a side view showing a further deformed state of a preformed coil. FIG. 13 is a perspective view of a coil forming jig. FIG. 14 is a perspective view showing a state in which the preformed coils have been loaded to the coil forming jig. FIG. 15 is a perspective view showing a state in which the winding portion (coil portion) is formed in a hexagonal shape. FIG. 16 is a front view showing a state in which the formed coils are arranged on the inner periphery of the stator core. FIG. 17 is a front view showing a state in which the formed coils are inserted into slots of the stator core. FIG. 18 is a side view comparing between the hexagonal shape before loading into the slots and that after loading into the slots. FIG. 19 is a wire connection diagram of coils.

For inserting the stator coil 413 into the slots 411 of the stator core 412 by lap winding as described above, first the stator coil (winding) 413 is wound round a winding form 14 which is like a thin flat sheet having round edges as in FIG. 9A. On long-side edges of the winding form 14, there are four pairs of hook pins 15, wherein each pair is composed of two hook pins being disposed substantially at equal pitches at close range as shown in FIG. 9B.

The winding for the stator coil (winding) 413 is wound plural turns (three turns in this embodiment) around the winding form 14 beside a hook pin 15 located at one end side in the longitudinal direction of the winding form 14 in such a manner that the stator coil 413 becomes scroll-like namely becomes the above-mentioned lap winding structure). Thereafter, the stator coil (winding) 413 is wound plural turns (three turns in this embodiment) around the winding form 14 beside the adjacent hook pin 15, whereby a pair of coils 4131a and 4131b is formed by a pair of plural winding portions (lap winding structure). In each of the pair of coils 4131a and 4131b, winding is performed from the inside to the outside on the winding form 14 so that scroll shaped-lap windings (scroll coil portions) are formed. Therefore, the two coils 4131a and 4131b are continuous from the outside of one coil (scroll-lap winding) 4131a to the inside of the other coil 4131b adjacent to the coil 4131a.

The winding end side wire of the pair of coils 4131a and 4131b is positioned on the outside of the lap winding portion (coil portion) 413b. The winding end side wire of the stator coil 413 (coils 4131a and 4131b), which is extended from the outside of the winding scroll 413b, is led to a next pair of hook pins of the four pairs along the long-side edge (where the hook pins 15 are provided) of the winding form 14. The next pair of hook pins is apart from the previous pair of hook pins by a length of slot pitch×5 which is the length permitting circumferential 90° shift of the pair of coils 4131a and 4131b. Then the winding wire led to the next hooks is wound around the winding form 14 beside the next hook pin 15 in the same manner as above. That is, four pairs of hook pins are provided such that each pair of adjacent hook pins 15 are positioned at every length corresponding to a circumferential 90° shift of four pairs of coils (4131a and 4131b). For forming such four pairs of coils (4131a and 4131b) with scroll winding portion (lap winding structure), the same winding operations are repeated four times, whereby the stator coil 413 is wound round the winding form shown in FIG. 9A.

Next, as shown in FIG. 10, the stator coil (lap windings) 413 thus wound round the winding form 14 is pressurized from both sides in a thickness direction of the winding form 14 with use of two pressurizing blocks 16 of substantially the same shape to eliminate both-side swellings of the stator coil 413. To facilitate the subsequent forming, it is preferable to use a self-welding line as the stator coil 413. When using the self-welding line, it is allowed to weld by supplying it with an electric current, thereby the coil elements of the stator coil is integrally firmed up. Insulating paper may be disposed around a slot inserting part in the coil portion of the stator coil 413. Thereby, both stator coil and the insulating paper may be fixed together when the stator coil is supplied with an electric current for fixing. By thus making the stator coil 413 and insulating paper integral with each other, not only the subsequent forming of the stator coil 413 becomes easier, but also it is possible to avoid damage to the coating on the coil surface when inserted into the slots 411.

Next, the above-mentioned preformed stator coil 413 which has been wound around the winding form 14, is removed from the winding form 14. For making it possible to remove the stator coil 413 from the winding form 14, the hook pins 15 are removable, or the winding form 14 can be divided in the height direction so that the spacing in the height direction can be narrowed after winding, or the hook pins 15 are made retractable into the winding form 14. The stator coil 413 thus removed from the winding form 14 has four pairs of oval-shaped winding portions 4131a and 4131b each as plural scroll-like turns (three turns in this embodiment) as shown in FIG. 11. Those pairs of coil portions (winding portions) are continuous with each other through crossover connecting wires 4132.

Next, as shown in FIG. 12, each preformed oval-shaped winding coil 4131 is pressed from side faces using a flat die 17 on one side and a generally trapezoidal punch 18 on the other side. Thus, the coil 4131 as an oval-shaped winding portion held grippingly in between the die 17 and the punch 18 and is formed in a generally P shape with one coil end side depressed. By thus forming the oval-shaped winding coil 4131 in the stator coil 413 into a generally P shape and disposing the depressed side on the outer periphery side of the stator core 412, the stator coil 413 does not project to the inner periphery side when the rotor 5 is inserted into stator core 412 and therefore the stator coil is not an obstacle to the insertion of the rotor 5.

In FIG. 13, there is shown a coil forming jig 19 for forming the stator coil 413 into a generally hexagonal shape. The coil forming jig 19 includes an inside member 19a and an outside member 19b which are divided from each other. Both members 19a and 19b are relatively rotatable in the circumferential direction. In the inside member 19a and the outside member 19b, they have the same forty-eight slots 191 as the number of slots formed in the stator core 412. The inside member 19a and the outside member 19b are disposed so that the slots 191 of the member 19a are open to the outside, the slots 191 of the member 19b are open to the inside, and both openings are opposed to each other. Further, the outermost periphery position, i.e., bottom, of each slot 191 in the outside member 19b is smaller in diameter than the inner periphery diameter of the stator core 412, and the axial length of each of the slots 191 in the outside and inside members 19b, 19a is larger than the axial length of each slot 411 in the stator core 412. Teeth 192 each formed between adjacent slots 191 in the inside and outside members 19a, 19b are formed so as to retract to the bottom side of the slots 191. As a method for retracting the teeth 192, there may be used a cam mechanism for example.

The coil portions of the stator coil 413 carried out in FIGS. 9A to 12 are inserted axially into the slots 191 of the coil forming jig 19 of FIG. 13. At this time, the insertion is performed in such a manner that the generally P-shaped projecting portion formed in FIG. 10 faces the outer periphery side of the coil forming jig 19. In the preformed continuous stator coil 413, the adjacent coil portion pairs 4131a and 4131b are inserted into adjacent slots 191. The other coil portion pairs 4131a and 4131b which are continuous through the crossover connecting wires 4132 are inserted respectively into 90° shifted slots 191. Also in other slots 191, coil portions of the other coils 4131 formed by continuous coil are axially inserted. In this way, all of three-phase stator coil 413 is inserted into the slots 191.

When the stator coil 413 is inserted as above into the slots 191 of the coil forming jig 19, such a state is shown in FIG. 14. The bundles on one side of the coil portions of coils 4131 in the stator coil 413 are positioned in the slots 191 of the outside member 19b, while the bundles on the other side of the coil portion of coils 4131 are positioned in the slots 191 of the inside member 19a. The portion of the crossover connecting wire 4132 as a connection between the coil portions (lap windings) of pair of coils 4131a and 4131b in the stator coil 413 is disposed in a generally scroll shape so as to make crossover between the outer periphery side and the inner periphery side of the stator core 412 as in FIG. 7, for in preparation for the next process, it is necessary that each crossover connecting wire 4132 is formed in the shape of a generally V- or U-shaped axial projection. In FIG. 14, showing the portion of the crossover connecting wire 4132 is omitted to facilitate understanding.

Next, in the state of FIG. 14, the inside and outside members 19a, 19b are relatively rotated in the circumferential direction by the predetermined amount of displacement as shown in FIG. 15. By so doing, the portion of the crossover connecting wire which connects coil end tops with each other does not change its position, but the bundles inserted into the outside member 19b and the bundles inserted into the inside member 19a in the stator coil 413 are twisted relatively, so that the coil portions 4131 of the stator coil 413 can be formed into a generally hexagonal shape. In this state, the coils of the coil bundle in each slot of the inside member 19a and outside member 19b can be maintained in a single row with a layer structure. In FIG. 15, showing half of the crossover connecting wires 4132 and of the stator coil 413 is omitted to facilitate understanding.

Next, all the teeth 192 disposed between the slots 191 in the coil forming jig 19 are retracted by a cam mechanism for example. Consequently, it becomes possible to remove the formed stator coil 413 axially from the coil forming jig 19. Though not shown in drawings, the coil assembly thus taken out is held on the outer periphery of a holding jig having a gear-like outer periphery surface and is disposed on the inner periphery side of the stator core 412 as shown in FIG. 16. Next, though not shown in drawings, the holding jig has push-out pieces capable of radially projecting outwardly at inside the stator coil 413. The push-out pieces are in a retracted state at the time of setting the stator coil assembly. The coil bundles are disposed respectively at positions corresponding to the openings of the slots 411 in the stator core 412. Also in FIG. 16, the crossover connecting wires 4132 are not shown to facilitate understanding.

Next, though not shown, the push-out pieces of the holding jig are pushed out radially and the coil bundles are inserted respectively into the slots 411 from the inner periphery side of the slots in the stator core 412. At this time, sectional V- or U-shaped prominences of the crossover connecting wires 4132, which protrude axially, are pressed in an axial direction of the stator core so as to become substantially on the same plane to the stator core end. FIG. 17 shows a pushed-out state of the coil assembly into the slots 411 of the stator core 412. The crossover connecting wires 4132 are omitted also in FIG. 17 to facilitate understanding.

An axial length of each of the slots 191 of the coil forming jig 19 used in forming the stator core in a hexagonal shape is larger than that of each slot 411 in the stator core 412, so that the rectilinear slot-inserted portion of each winding portion 4131 of the stator coil 413, which is formed in a generally hexagonal shape, is larger than the axial length of each slot 411 in the stator core 412, thus permitting easy insertion of the coil into the slot 411. That is, when inserting the stator coil 413 into the slots 411 of the stator core 412, there is no fear that the curved portions of the stator coil 413 may be caught in both axial-end openings of the slots 411. Therefore, in a state where the lap windings of stator coil 413 are inserted into the slots 411 of the stator core 412, as shown in FIGS. 15 and 18, extending portions 418 thereof can protrude from both axial end sides of the slots 411 in the axial direction of the slots 411.

Thus, when inserting the coil assembly into the slots 411 of the stator core 412, since the slots 411 are formed radially, it is necessary that the coils 4131 as winding portions formed in a generally hexagonal shape be deformed so as to be wide in the circumferential direction as shown in FIG. 18. At this time, each coil end formed in a generally V shape deforms itself so as to become lower in its v-shape height.

Next, a crossover connecting wire 4132 provided separately as a neutral point and the coil end portion of each coil are connected together by TIG welding for example and coils of the same phase are connected together to complete winding of the stator coil 413 on the stator core 412. The crossover connecting wires 4132 serving as neutral points also make crossover so as to straddle the outer periphery side and the inner periphery side of the stator core 412. Therefore the crossover connecting wires 4132 as a whole are arranged in a close-to-scroll shape like.

Lastly, the holding members 416 are loaded axially of the stator core 412 into the holding grooves 417 formed in both circumferential side faces on the tip end side of the teeth 414 in the stator core 412.

FIG. 19 shows a final state of wire connection of the stator coil 413 thus connected. The coils 4131 as winding portions in FIG. 19 are illustrated as one turn, but are actually wound three turns. Slot numbers are indicated centrally of each winding portion 4131 in FIG. 19. Broken line coils are each positioned on the inner periphery side in the slot 411, i.e., on the slot open side, while solid line coils are each positioned on the outer periphery side, i.e., on the slot bottom side. The circled intersecting points of lines indicate portions to be welded. As is apparent from FIG. 19, it is only nine places that are required to be connected by welding.

The first embodiment has been described above. Next, the following description is now provided about the function and effect of the first embodiment.

The rotating machinery of the first embodiment has a rotor disposed rotatably inside the stator which is formed in a cylindrical shape. The stator comprises a stator core having plural slots formed in the circumferential direction, the slots each having a coil inserting portion on the inner periphery side, and coils wound by lap winding into the slots respectively. At least the lap-wound portion of each coil comprises a continuous line, which is wound so as to straddle the inner periphery side and the outer periphery side of the associated slot at a coil end. Thus, no matter how many times the winding portion turns, there is no increase in the number of connections, so that it is possible to minimize the number of connections. Consequently, it is possible to reduce the number of connecting steps, lessen the processing for insulation and improve the reliability of strength. Besides, since coil ends are wound so as to straddle the inner periphery side and the outer periphery side of slots, it is not that coil ends extending from different slots are arranged axially of the stator core, but are arranged in the circumferential direction so as not to interfere with each other. Accordingly, it is possible to shorten coil ends and hence possible to shorten the axial length of the rotating machinery. The coil cooling performance is also improved. Further, since such a lap winding makes it possible to push out coil assembly preformed annularly into the slots, it is possible to wind coils easily round the stator core. Additionally, since coils are wound in a continuous manner, it is possible to increase the number of coils in each slot and hence possible to reduce loss induced by higher harmonic.

In the rotating machinery of the first embodiment, moreover, since the winding wire has a generally rectangular sectional shape, it is possible to improve the percent occupancy of coils in each slot of the stator core. Particularly, by adopting the lap winding, coils having a generally rectangular section can be wound in a state like lamination. As a result, it is possible to attain both high output and good rotation characteristics.

In the rotating machinery of the first embodiment, the section of each coil is, in a generally rectangular shape, long in the normal line direction of the stator core and short in the radial direction. Consequently, the number of coils in each slot can be made as many as possible and the effect of reducing the loss induced by higher harmonic can be made more outstanding. Also in point of space in the stator, the length on the side protruding from a coil end becomes short, so that it is possible to make the amount of coil end protrusion smaller. Further, when a thick of each winding (coil) is thin, it is difficult to form thin coils one by one. But, in this embodiment, coils are lap-wound and bundled, it is possible to effect coil forming easily even if the thick of each winding is thin.

In the rotating machinery of the first embodiment, coils comprise plural phases and winding portions of the same phase are loaded in plural slots spaced away in the circumferential direction and are connected together through crossover connecting wires. Consequently, winding portions in each phase can be arranged efficiently.

In the rotating machinery of the first embodiment, crossover connecting wires are continuous with the coils of the same phase. Consequently, it is possible to further reduce the number of connections.

In the rotating machinery of the first embodiment, since crossover connecting wires are provided on only one axial end side of the stator, the axial length of the stator can be made shorter than in the case where crossover connecting wires are provided at both axial ends of the stator.

In the rotating machinery of the first embodiment, since crossover connecting wires are provided in a stream line close to generally scroll shape so as to have a crossover between the outer periphery side and the inner periphery side of the stator core, it is possible to minimize such places as crossover connecting wires overlap axially of the stator. Consequently, it is possible to shorten the axial length of the stator.

In the rotating machinery of the first embodiment, since crossover connecting wires are provided so as to be positioned on substantially the same plane axially of the stator, it is possible to further shorten the axial length of the stator.

In the rotating machinery of the first embodiment, since an insulating member is fixed to a slot inserting portion of each coil, it is possible to avoid damage of the coil surface coating at the time of coil forming or insertion of each coil into a slot.

In the rotating machinery of the first embodiment, since the winding portions are formed in a generally hexagonal shape, it is possible to form coils in a shape such that a coil winding passes through a slot spaced away two or more slots in the circumferential direction from an oval winding-formed coil.

The rotating machinery of the first embodiment has a rotor disposed rotatably on the inner periphery side of an cylindrically-formed stator. The stator comprises a stator core which has a plurality of slots for coil insertion formed on the inner periphery side in the circumferential direction of the stator core, and coils of plural phases wound in the slots spaced apart two or more slots from each other. The coils are each constituted by a square line having a generally square section. The winding portions of the coils are provided in a plural number adjacently by continuous coils of the same phase, the plural winding portions are loaded into the slots adjacent to each other and wound so as to straddle between the inner periphery side and the outer periphery side of the slots at ends. According to this arrangement, since adjacent winding portions are inserted into adjacent slots, it is possible to make the number of slots larger than in the case where adjacent winding portions are inserted into the same slot. Consequently, a waveform resulting from synthesis of magnetomotive forces of phases can be made a smooth waveform, whereby it becomes possible to reduce torque pulsation and noise. Besides, since the number of slots can be made large, it is possible to reduce an eddy current loss induced by higher harmonic. Moreover, since winding portions are spaced away in the circumferential direction, it is possible to improve the cooling performance.

In the rotating machinery of the first embodiment, since two winding portions of the same phase are provided in plural slots spaced apart in the circumferential direction and are connected together through crossover connecting wires, the winding portions in each phase can be disposed efficiently.

In the rotating machinery of the first embodiment, since coil ends where crossover connecting wires are drawn out to the outer periphery side of winding portions are connected together, there is no intersection between crossover connecting wires and winding portions, thus making it possible to shorten the axial length of the stator.

The rotating machinery of the first embodiment has a rotor disposed rotatably inside the stator formed cylindrically; the stator has a stator core comprising a plurality of slots which are disposed in the circumferential direction and have coil insertion portions on the inner periphery side thereof, and coils wound so as to wind within the slots spaced apart two or more slots from each other.

At least the winding portions are constituted by a continuous line and wound so as to a straddle an inside and outside of the slots at coil ends, and wherein extending portions of the winding portions protrudes axially from both ends of the slots. Therefore, when inserting the preformed coils from the inner periphery side of the stator core, there is no fear that the curved coil portions may be caught in both axial-end openings of the slots in the stator core. Consequently, it is possible to insert coils into the slots without damaging the insulating portion.

In the rotating machinery of the first embodiment, since the coil inserting portion of each slot is formed as an open slot having a circumferential width almost equal to or larger than the coil loading portion, it is easy to insert the coil from the coil inserting portion of the slot and the percent occupancy of the coil within the slot is not deteriorated.

In the rotating machinery of the first embodiment, since a holding member for preventing movement of each coil toward the inner periphery side is mounted on the inner periphery side of the coil insertion portion of each slot, it is possible to prevent dislodgment of the coil from the coil insertion portion of the slot.

In the rotating machinery of the first embodiment, since in at least winding portions of coils the constituent wires are fixed together, there is no fear of separation of the coil wires and the coils can be inserted easily into the slots. Moreover, when forming the winding portions of the preformed coils into hexagonal shape, the laminated coils can be deformed in an integral manner, the formability is also improved.

[Second Embodiment]

Figure 20:
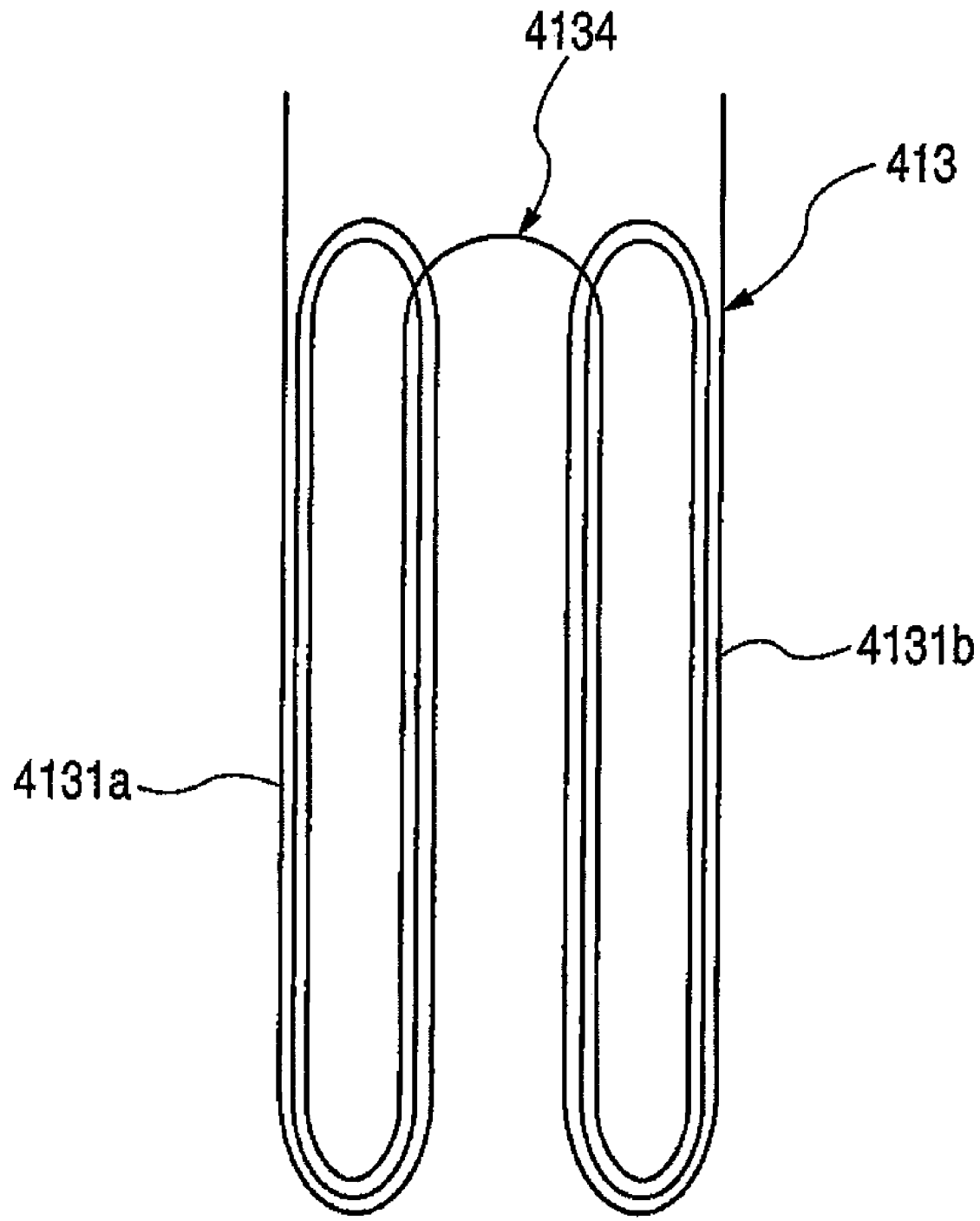
FIG. 20 is a schematic diagram showing a pair of coils in a second embodiment of the present invention.

A second embodiment of the present invention will be described below with reference to FIG. 20. FIG. 20 shows in a simplified manner a method for winding a pair of winding portions. As to the portions common to the first embodiment, they are named by the same names and identified by the same reference numerals as in the first embodiment.

The first and second embodiments are different in how to continuously form a pair of lap winding portion (coil portions) 4131a and 4131b wound in a scroll shape in the stator coil 413. The other portions are the same as in the first embodiment and therefore explanations thereof will be omitted. In the first embodiment, a lap winding starts from a coil end on the inner periphery side, the coil 4131a of the first winding portion is wound so as to be scroll-shaped from the inner periphery side toward the outer periphery side, the coil extending to the outer periphery side is extended to the inner periphery side of the coil 4131b of the second winding portion, and further the coil 4131b of the second winding portion is wound so as to be scroll-shaped on the outer periphery side. That is, since the coil-to-coil extending line 4134 for connection between the coil 4131a of the first winding portion and the coil 4131b of the second winding portion advances toward the inner periphery side from the outer periphery side, there is an intersecting portion of coil wires.

On the other hand, in this second embodiment, as shown in FIG. 20, a lap winding starts on the outer periphery side of the coil 4131a of the first winding portion, the coil 4131a of the first winding portion is wound so as to be scroll-shaped from the outer periphery side toward the inner periphery side, then the coil extended to the inner periphery side is extended to the inner periphery side of the coil 4131b of the second winding portion, and further the coil 4131b of the second winding portion is wound so as to be scroll-shaped from the inner periphery side toward the outer periphery side. That is, since the coil-to-coil extending line for connection between the coil 4131a of the first winding portion and the coil 4131b of the second winding portion is connected on the inner periphery sides of the coils, there is not any intersecting portion of coil wires.

By adopting the above winding method it is possible to further simply coil ends and shorten the axial length of the stator 4. Although in FIG. 20 there are shown only a pair of winding coils 4131a and 4131b, four pairs of winding portions may be formed using a continuous line.

[Third Embodiment]

Figure 21:
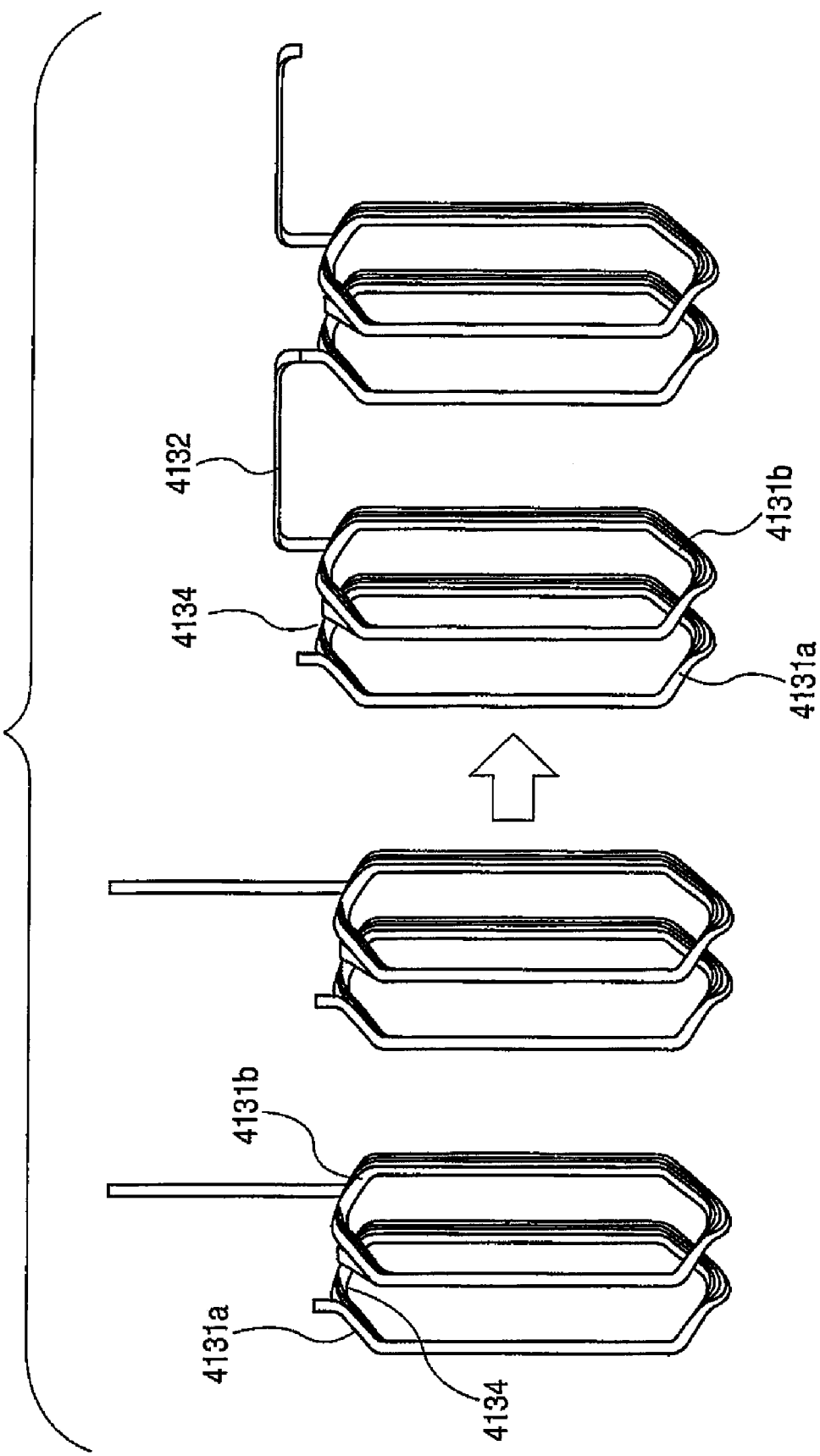
FIG. 21 is a diagram explanatory of a crossover connecting wire for connection between coil pairs in a third embodiment of the present invention.

A third embodiment of the present invention will now be described with reference to FIG. 21. FIG. 21 shows that across line is used for connection of coil pairs, each pair consisting of winding portion coils 4131a and 4131b. As to the portions common to the other embodiments, they are named by the same names and identified by the same reference numerals as in the other embodiments.

In the stator coils 413 described in the first and second embodiments, as shown in FIG. 24, one set, i.e., four pairs, of lap winding portion (coils) 4131a and 4131b are formed using a continuous line. But in this third embodiment, a different stator coil 413 is formed at every pair of winding portions and lastly the winding portion pairs 4131a and 4131b are connected by welding for example. More specifically, one coil end side in one pair of winding portion coils 4131a and 4131b is made longer by a length corresponding to a crossover connecting wire 4132 and, after insertion into a slot 411 of the stator core 412, the crossover connecting wire 4132 is deformed and connected to the other winding portion pair by TIG welding for example.

By thus taking into account so that the crossover connecting wire 4132 can be connected later, it is not necessary to give consideration to deformation of the crossover connecting wire 4132 when inserting a coil assembly into a slot 411 of the stator core 412 while enlarging the coil diameter. Therefore, the degree of layout freedom of the crossover connecting wire 4132 can be improved although the number of connected parts somewhat increases. Besides, since the crossover connecting wire 4132 is a coil end on one side of each winding portion coil 4131, the number of parts and of connected parts can be decreased in comparison with the case where only the crossover connecting wire is formed as a separate line.

Each pair of winding portion coils in FIG. 21 has been wound by the winding method described above in connection with FIG. 20.

[Fourth Embodiment]

Figure 22:
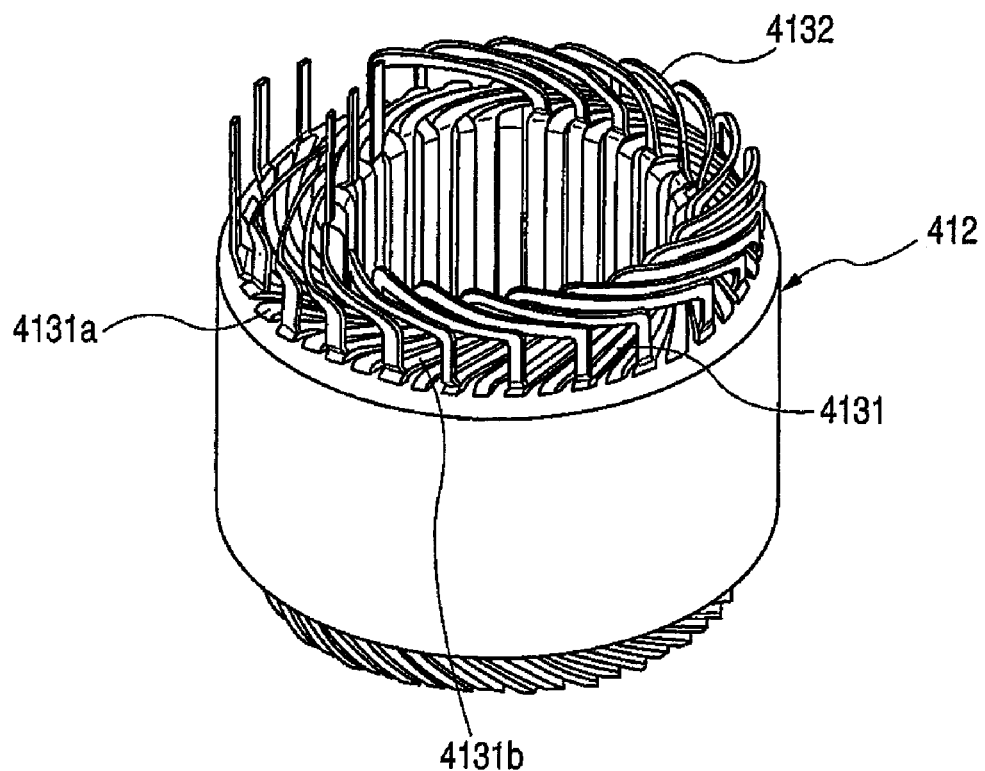
FIG. 22 is a perspective view of a stator according to a fourth embodiment of the present invention.

A fourth embodiment of the present invention will be described below with reference to FIG. 22. FIG. 22 is a perspective view of a stator according to a fourth embodiment of the present invention. As to the portions common to the other embodiments, they are named by the same names and identified by the same reference numerals as in the other embodiments.

This fourth embodiment is different in the way of connection of the crossover connecting wire 4132 from the first embodiment. Further, each pair of winding portion coils 4131a and 4131b are wound by alpha winding as in the second embodiment. Other constructional points are the same as in the previous embodiments. The crossover connecting wire 4132 in the first embodiment extends from a coil end top of each winding portion coil 4131, but the crossover connecting wire 4132 in this fourth embodiment straddles the coil insertion side from the bottom side of a slot 411 in each winding portion coil 4131. More specifically, of coil ends positioned on the outer periphery side of winding portion coils 4131, those positioned on the bottom side of slots 411 are deformed stepwise from the winding portion coils 4131 toward the outer periphery side of the stator core 412 and are extended toward the coil end tops. The thus-extended coil ends are further extended in a generally close-to-scroll shape as in the first embodiment from the outer periphery side to the inner periphery side of the coil ends and are contiguous with the coil insertion side of the other winding portion coils 4131. This coil insertion side, like the slot bottom side, is also deformed stepwise toward the inner periphery of the stator core 412 and is contiguous with the associated coil end top. In FIG. 22, the coil assembly connecting portion including a crossover connecting wire as a neutral point and a continuous line is not shown.

Thus, in this fourth embodiment, since the crossover connecting wire 4132 does not extend from the coil end top, it is possible to further shorten the axial length of the stator 4. Besides, since the crossover connecting wire is formed so that the long side of the square line faces the axial direction of the crossover connecting wire 4, the crossover connecting wire can be disposed to a satisfactory extent even in the case where the stator core 412 is of a small diameter.

In this fourth embodiment the crossover connecting wire 4132 does not extend from the coil end top but extends from the coil inserting portion of the slot, so that there is a great change in length when forming the winding portion coil 4131 into a generally hexagonal shape. To avoid such an inconvenience, as described above in the first embodiment, before forming the winding portion coil 4131 into a generally hexagonal shape, the crossover connecting wire 4132 is folded in a generally V or U shape axially or radially, followed by forming into a generally hexagonal shape, or the folded crossover connecting wire 4132 is allowed to extend when inserting the coil into each slot 411 in the stator core 412. The winding method for each pair of winding portion coils 4131a and 4131b is not limited to the method shown in FIG. 20, but there may be adopted such a winding method as described in the first embodiment.

[Fifth Embodiment]

Figure 23:
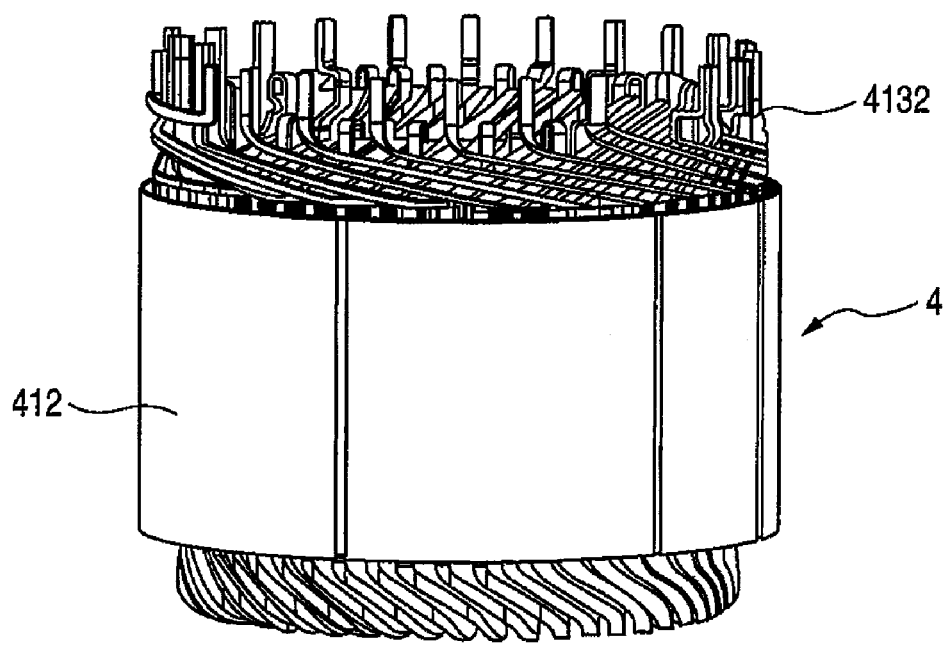
FIG. 23 is a perspective view of a stator according to a fifth embodiment of the present invention.

A fifth embodiment of the present invention will be described below with reference to FIG. 23. FIG. 23 is a perspective view of a stator according to a fifth embodiment of the present invention. As to the portions common to the other embodiments, they are named by the same names and identified by the same reference numerals as in the other embodiments.

This fifth embodiment is different in the shape and layout of the crossover connecting wire 4132 from the fourth embodiment, but the other constructional points are the same as in the fourth embodiment. In the case of the crossover connecting wire 4132 described in the fourth embodiment, a scroll shape is formed on the tip end side with respect to the coil end top, but the crossover connecting wire 4132 used in this fifth embodiment is formed in streamline close to a spiral shape-like on the outer periphery side of the stator core 412 and is connected to another winding portion coil 4131. In this fifth embodiment the crossover connecting wire 4132 is formed spirally on the outer periphery side of the stator core 412 and at a coil end portion it is connected to the end of the winding portion coil 4131, but FIG. 23 shows a state before welding coils. Actually, however, lines projecting axially of the stator 4 are fusion-bonded together by TIG welding for example, so that the axially projecting portions are fused and extracted approximately to the coil end position.

In this fifth embodiment described above the number of connected parts somewhat increases, but each crossover connecting wire 4132 can be disposed without so much projecting axially of the stator 4 from the coil end top, so that it becomes possible to make the axial length of the stator 4 still shorter than in the fourth embodiment. By improving the forming method it becomes possible to constitute the crossover connecting wire 4132 with use of a line which is contiguous to the winding portion coil 4131. Further, the spirally-formed portion may be spiral on the coil inserting side, i.e., on the inner periphery side of the stator core 412, or it may be spiral on both inner and outer periphery sides of the stator core 412.

Although functions and effects of the embodiments of the present invention have been described above, there may be adopted various other constructions in the present invention. For example, although in the above embodiments there may be adopted a square line having a generally square section in terms of a coil section, this line need not always be a complete square line. For example, each side may be a deformed curved line, not a straight line, like that when crushed finally within a slot. There also may be adopted, as a sectional coil shape, a generally circular shape, a generally elliptic shape, or a generally polygonal shape other than the quadrangular shape having four sides. In case of using a quadrangular shape, the quadrangular shape may be a shape having a generally square section or a generally rectangular shape which is short in the normal line direction of the stator core and long in the radial direction.

Although in the above embodiments reference has been made to an inductor motor as an example of the rotating machinery, the rotating machinery may be a magnet type synchronous motor having permanent magnets in the circumferential direction of the rotor. In case of adopting such a magnet type synchronous motor there may be adopted a surface magnet type rotor wherein plural magnets are arranged on the surface of the rotor and are fixed with a ring or the like formed of anon-magnetic material or a built-in magnet type rotor wherein axially extending holes are formed in plural circumferential positions on the inner periphery side of the rotor and magnets are installed within those holes. Further, in case of using the rotating machinery as a vehicular AC generator, there may be used a Randle type rotor with field coils wound therein.

Although in the above embodiments the magnetic portions in the stator core and the rotor are each formed by a lamination core, there may be adopted a dust core formed by compressing and hardening ion powder coated on the surface thereof with an insulating film. As the stator core there may be adopted a divided type stator core formed by fixing plural members.

Although in the above embodiments the conductor bars and the short-circuit rings are formed by aluminum, they may be formed using copper. If copper is used as the material of the conductor bars and the short-circuit rings, the electric resistance can be made lower than in case of using aluminum, whereby it is possible to improve the efficiency of the motor.

Although in the above embodiments the number of slots is set forty-eight, the number of slots may be changed according to specification. In the case where the number of slots is changed, it is also necessary to change the layout of winding portions.

Although in the above embodiment each pair of winding portions are constituted using a continuous line so as to be adjacent each other, welding or the like may be adopted for connection after the insertion of coils into the stator core if an increase in the number of connected parts is allowed. Adjacent winding portions need not always be two pairs and the number of times of scroll-like windings can be set freely in accordance with specification.

Although in the above embodiments a self-fusing line is used for fusion-bonding of coil, there may be used another material for fixing such as an adhesive or a tape. A certain forming method permits the execution of forming even without the fixing.

Although in the above embodiments coils are inserted into the slots of the stator core after integrally fixing insulating paper to the coils, the insertion of coils may be done after disposing the insulating paper into the slots. In this case, if the insulating paper is projected so as to expand from the inner periphery-side opening of each slot, it is possible to effect the insertion of coil easily.

Although in the above embodiments the slots are open slots, the inner periphery end of each of the teeth may be extended in the circumferential direction. In case of adopting open slots, the holding member used in the above embodiments may be substituted by molding the inner periphery ends of the teeth with resin or the like.

Although in the above embodiments winding portions are formed in a generally hexagonal shape and are inserted in this shape into the stator core, the shape in question need not always be a hexagonal shape, but may be a large oval shape.

Figure 28:
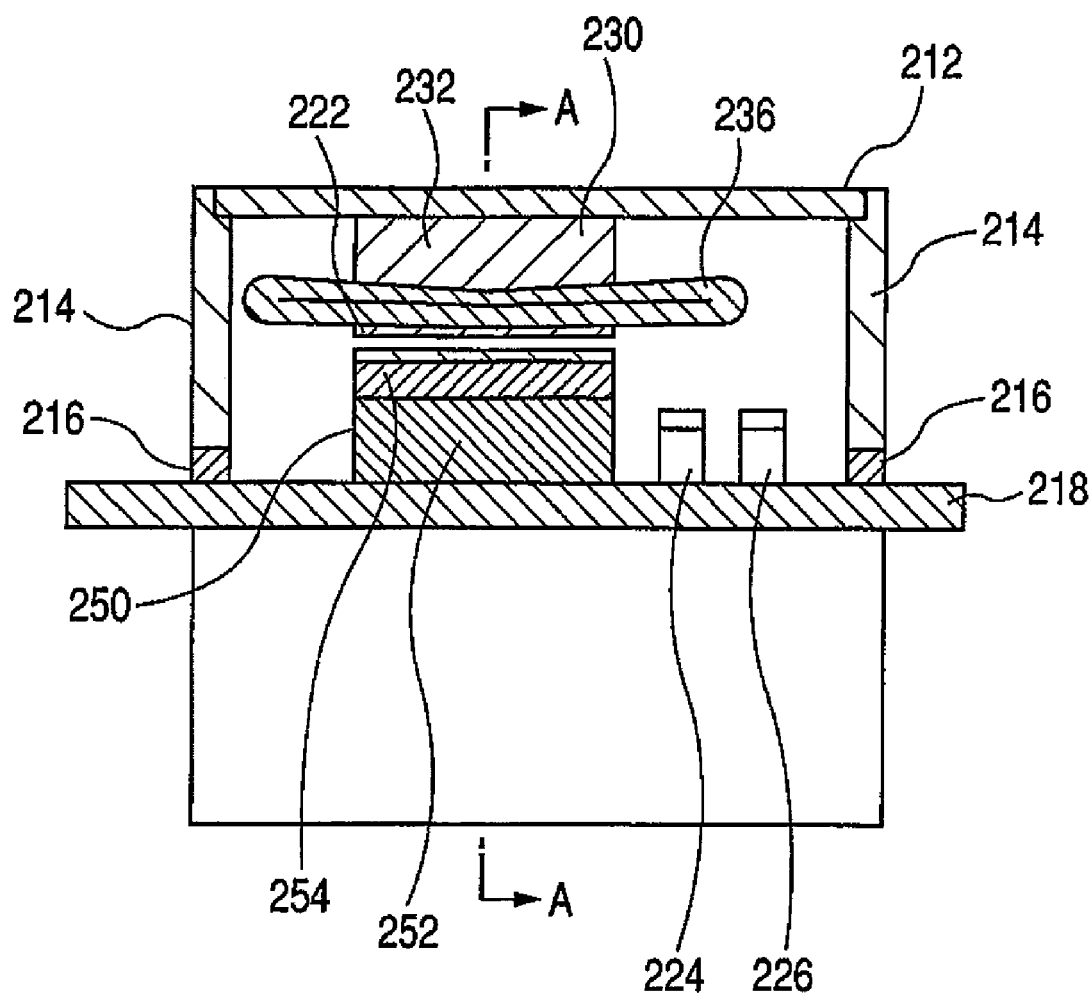
FIG. 28 is a sectional view of a permanent magnet type rotating machinery as seen along a rotational axis.
Figure 29:
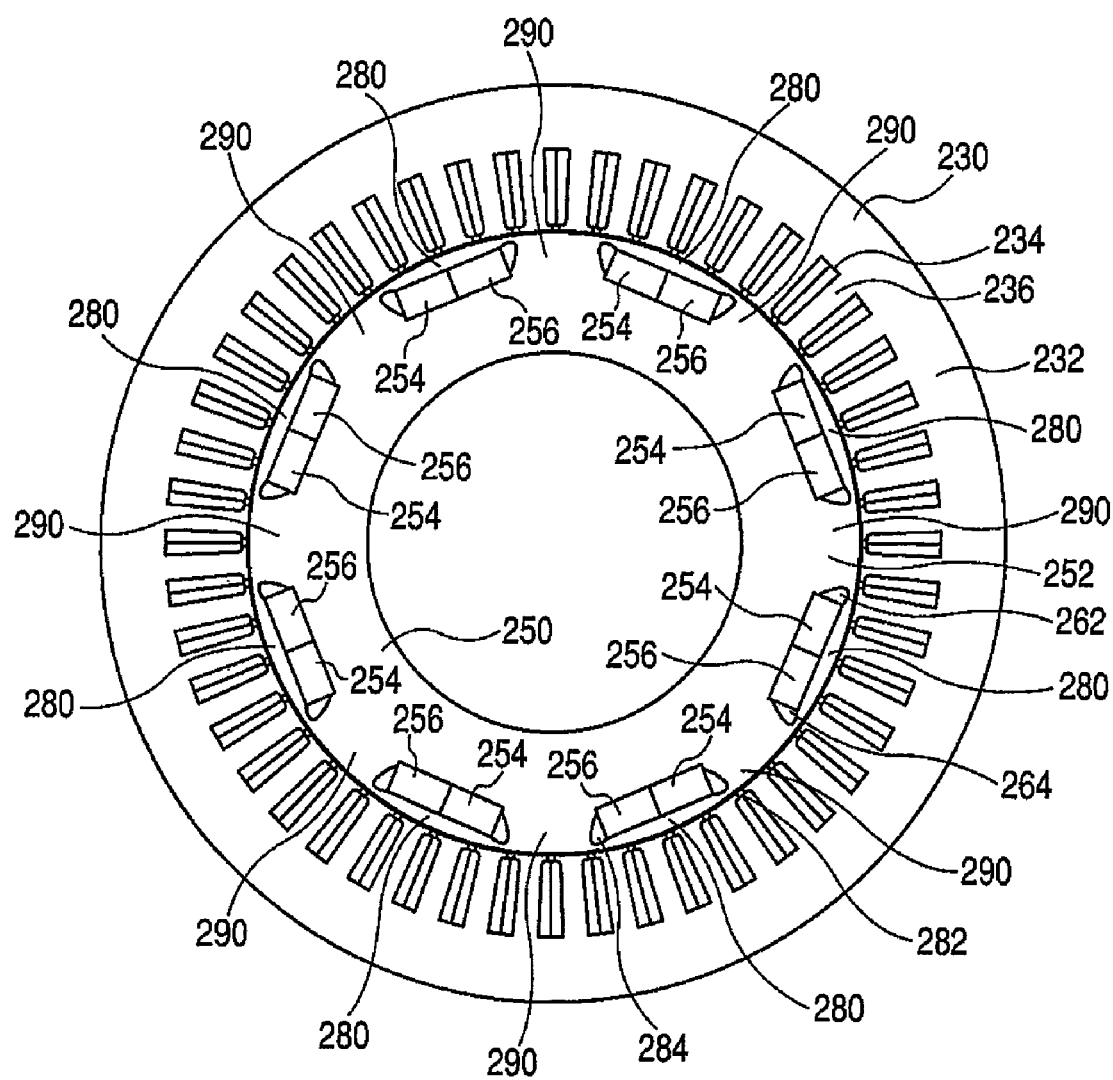
FIG. 29 is a sectional view of a stator and a rotor on a plane perpendicular to the rotational axis.

The stator winding described above is applicable not only to an inductor motor but also to a permanent magnet rotating machinery. Now, with reference to FIGS. 28 and 29, a description will be given below about a permanent magnet rotating machinery using the above stator winding. FIG. 28 is a sectional view of a permanent magnet rotating machinery 200 and FIG. 29 is a sectional view taken on line A-A of a stator 230 and a rotor 250 both shown in FIG. 28. A housing 212 and a shaft 218 are not shown in FIG. 28.

A stator 230 is held in the interior of a housing 212. The stator 230 includes a stator core 232 and the foregoing stator winding indicated at 238 referred to above. A rotor 250 having permanent magnets 254 is disposed through a gap 222 relative to the stator core 232. The housing 212 has end brackets 214 on both sides in a rotational axis direction of a shaft 218. The shaft 218, which has the foregoing rotor core indicated at 252, is held by the end brackets 214 rotatably through bearings 216.

On the shaft 218 are mounted a rotor position sensor 224 for detecting the position of pole in the rotor and a rotational speed sensor 226 for detecting a rotational speed of the rotor. A three-phase alternating current to be supplied to the stator winding is controlled on the basis of outputs of those sensors.

A concrete structure of the stator 230 and that of the rotor 250 both shown in FIG. 28 will now be described with reference to FIG. 29. The stator 230 has a stator core 232. As in the foregoing structure, the stator core 232 has a large number of slots 234 and teeth 236 equally in the circumferential direction. The slots 234 each have the stator winding 238 of the structure described above. As shown in FIG. 29, the number of slots of the stator core in this embodiment is forty-eight, but no limitation is made thereto.

The rotor core 252 is formed with permanent magnet inserting holes for insertion therein of permanent magnets 254 and 256. The permanent magnets 254 and 256 are inserted into the permanent magnet inserting holes. The permanent magnets 254 and 256 are each magnetized in a direction in which the stator-side face of the magnet is N or S pole. The magnetizing direction reverses pole by pole of the rotor.

In the embodiment illustrated in FIG. 29 both permanent magnets 254 and 256 act as one pole in the rotor 250. Poles of the rotor 250 having the permanent magnets 254 and 256 are arranged at equal pitches in the circumferential direction of the rotor 250. In this embodiment the number of such poles is eight, provided no limitation is made thereto. The number of such poles may be in the range of ten to thirty, or even more as the case may be. It depends on such a condition as an output required of the rotating machinery. The larger the number of poles, the larger the number of magnets and the lower the working efficiency. As the case may be, the number of poles may be not larger than eight. The portion of the rotor core present on the stator side of the permanent magnets 254 and 256 acting as poles of the rotor 250 acts as pole pieces 280 and magnetic lines of force entering and leaving the permanent magnets 254 and 256 get into and out of the stator core 232 through the pole pieces 280.

As described above, the permanent magnets 254 and 256 acting as poles of the rotor 250 are magnetized in opposite directions pole by pole. Assuming that the magnets 254 and 256 of a certain pole are magnetized so as to be N pole on the stator side and S pole on the shaft side, the permanent magnets 254 and 256 acting as poles on both adjacent sides are magnetized so as to be S pole on the stator side and N pole on the shaft side. The rotor 250 has portions acting as auxiliary poles 290 present between its poles. Reluctance torque is generated due to a difference in magnetic resistance between magnetic circuits of q-axis magnetic fluxes passing through the auxiliary poles 290 and magnetic circuits of d-axis magnetic fluxes passing through the magnets. Bridge circuits 282 and 284 are present between the auxiliary poles 290 and the pole pieces 280. In the bridge circuits 282 and 284 the sectional area of the magnetic circuit is narrowed by magnetic gaps 262 and 264. Consequently, a magnetic saturation phenomenon occurs in each of the bridge portions 282 and 284 and the amount of magnetic flux passing between each pole piece 280 and auxiliary pole 290, i.e., between bridge portions 282 and 284, is kept to a predetermined amount or less.

In the rotating machinery shown in FIGS. 28 and 29, on the basis of the outputs of the rotational speed sensor 226 and the rotor position sensor 224 in the rotor, the switching operation of the inverter illustrated in FIG. 24 is controlled and the operation of converting the DC power fed from the secondary battery into a three-phase AC power is controlled. This three-phase AC power is fed to the stator winding 238 shown in FIGS. 28 and 29, then the frequency of the three-phase AC is controlled on the basis of the detected value provided from the rotational speed sensor 226a and the phase of the three-phase AC for the rotor is controlled on the basis of the detected value provided from the rotor position sensor 224.

A rotating magnetic field based on the above phase and frequency is generated in the stator 230 by the above three-phase AC. The rotating magnetic field of the stator 230 acts on the permanent magnets 254 and 256 of the rotor 250, with the result that magnet torque based on the permanent magnets 254 and 256 is created in the rotor 250. Likewise, the aforesaid rotating magnetic field acts on the auxiliary poles 290 of the rotor 250 and reluctance torque is generated in the rotor 250 on the basis of a difference in magnetic resistance between magnetic circuits of the rotating magnetic field passing through the magnets 254 and 256 and magnetic circuits of the rotating magnetic field passing through the auxiliary poles 290. The rotating torque of the rotor 250 takes a value which is determined in accordance with the magnet torque based on the permanent magnets and the reluctance torque based on the auxiliary poles.

Since the reluctance torque occurs due to a difference between the magnetic resistance induced by passing through the magnets of the rotating magnetic field generated by the stator winding and the magnetic resistance induced by passing of the said magnetic field through the auxiliary poles 290, the inverter 620 shown in FIG. 24 controls a synthetic vector of an armature magnetomotive force induced by the stator winding 238 so as to lie on a leading side in the rotational direction with respect to the central position of each auxiliary pole and reluctance torque is generated by a leading phase of the rotating magnetic flux relative to the auxiliary poles 290 in the rotor.

In a starting or low-speed operation state of the rotating machinery the said reluctance generates rotational torque in the rotor 250 in a direction in which it is added to the magnet torque induced by the permanent magnets 254 and 256, so that the required torque which the rotating machinery must generate can be created by the added torque of both magnet torque and reluctance torque. Therefore, the generation of the magnet torque can be reduced by an amount corresponding to the reluctance torque and it is possible to reduce the magnetomotive force of the permanent magnets. By reducing the magnetomotive force of the permanent magnets it is possible to suppress the voltage induced by the permanent magnets during high-speed operation of the rotating machinery, resulting in that the supply of electric power to the rotating machinery in high-speed rotation becomes easier. Further, there accrues an effect that the amount of magnets can be decreased by making the reluctance large. Since rare earth permanent magnets are expensive, the capability of decreasing the amount of magnets is desirable also from the economic point of view.

The above stator winding is applicable to induction type rotating machinery and permanent magnet type rotating machinery, and by using it in these rotating machineries it is possible to obtain highly reliable rotating machineries. Besides, since there is disposed one wire in the circumferential direction of each slot, it is possible to not only reduce torque pulsation but also provide rotating machinery superior in productivity. In the above embodiments, coils of plural windings can be produced with a continuous wire and hence it is possible to obtain rotating machinery with reduced connection points and superior in productivity.

What is claimed is:

1. A rotating machine for a vehicle, having a stator and a rotor disposed rotatably inside the stator; wherein:
   the stator comprises a stator core including slots disposed at a uniform pitch throughout its circumference, and a stator coil disposed within the slots;
   the stator core comprises a plurality of coil part pairs, each using two coil parts having a first coil portion with a lap winding structure and a second coil portion also with a lap winding structure;
   each of the pairs is configured such that the first coil portion and the second coil portion thereof are connected to each other in series through a coil-to-coil extending line at inner periphery sides of the first coil portion and the second coil portion;
   one-side halves of the first and second coil portions are disposed into two adjacent slots on a rotor side of the slots respectively and other-side halves thereof are disposed into two other adjacent slots on a bottom side Of the slots respectively, wherein the two adjacent slots and the two other adjacent slots have a predetermined mechanical angle therebetween, and wherein at either the one-side halves or the other-side halves, at one end side of the corresponding adjacent slots, the coil-to-coil extending line is provided to connect between the first coil portion and the second coil portion;
   the respective coil part pairs are wound, with a substantially hexagonally shaped lap winding structure having plural turns, through one of the slots of the two adjacent slots and another of the slots of the two other adjacent slots respectively, with crossover connecting wire portions that bridge over an axial extremity of the coil portions in a substantially spiral shape, and connect the coil part pairs to each other;
   a transition from a rotor side of each coil portion in the one slot of the two adjacent slots to a bottom side of the coil portion in the other slot of the two other adjacent slots is formed via a coil end of said coil portion, extending in approximately the same direction;
   the respective coil part pairs are connected to each other through the crossover connecting wire portions, which are disposed beyond an axial extent of the respective coil part pairs; and
   the coil portions of the coil part pairs are formed collectively and continuously with each other, with the crossover connecting wire portions, and with the coil-to-coil extending line by a single continuous wire that has a substantially rectangular cross section and runs continuously through and between all of the coil portions and the crossover connecting wire portions.

2. A rotating machine for a vehicle, comprising a stator and a rotor disposed rotatably inside the stator; wherein:
   the stator has a stator core including slots disposed at a uniform pitch throughout its whole circumference, and a stator coil disposed within the slots;
   the stator core comprises a plurality of coil part pairs, each using two coil parts having a first coil portion with a lap winding structure and a second coil portion also with a lap winding structure;
   each of the pairs is configured such that the first coil portion and the second coil portion thereof are connected to each other in series through a coil-to-coil extending line at inner periphery sides of the first coil portion and the second coil portion;
   one-side halves of the first and second coil portions are disposed into two adjacent slots on a rotor side of the slots respectively and other-side halves thereof are disposed into two other adjacent slots on a bottom side of the slots respectively, wherein the two adjacent slots and the two other adjacent slots have a predetermined mechanical angle therebetween, and wherein at either the one-side halves or the other-side halves, at one end side of the corresponding adjacent slots, the coil-to-coil extending line is provided to connect between the first coil portion and the second coil portion;

the respective coil part pairs are wound, with a substantially hexagonally shaped lap winding structure having plural turns, through respective ones of the two adjacent and the other two adjacent slots, with crossover connecting wire portions bridging over an axial extremity of the coil portions in a substantially spiral shape and connected between the coil part pairs in series;

a transition from a rotor side of each coil portion in one slot of the two adjacent slots to a bottom side of such coil portion in another slot of the two other adjacent slots is formed via coil ends of the respective coil portions extending in approximately the same direction;

the respective coil part pairs are connected through the crossover connecting wire portions disposed outside the coil ends; and the coil portions of the coil part pairs are formed collectively and continuously with each other, with the crossover connecting wire portions, and with the coil-to-coil extending line by a single continuous wire that has a substantially rectangular cross section such that each such coil portion is connected to the other coil portions of the stator coil by the same continuous wire that forms, collectively, the coil portions.

3. The rotating machine according to claim 1, wherein a plurality of wires constituting the coil portions on the rotor side and the bottom side in each slot are arranged in a radial direction of the slot, and the wires are arranged in a single row in the slot.

4. The rotating machine according to claim 1, wherein:
all of the respective crossover connecting wire portions are arranged at the same axial end of the stator, beyond axial ends of the coil portions; and
each of said crossover connecting wire portions spirals, continuously radially outwardly and circumferentially, from a radial location at said rotor side of said one slot to said bottom side of said other slot.

5. The rotating machine according to claim 4, wherein said crossover connecting wire portions lie in a plane that is perpendicular to an axial direction of the rotating machine.

6. The rotating machine according to claim 2, wherein:
all of the respective crossover connecting wire portions are arranged at the same axial end of the stator, beyond axial ends of the coil portions; and
each of said crossover connecting wire portions spirals, continuously radially outwardly and circumferentially, from a radial location at said rotor side of said one slot to said bottom side of said other slot.

7. The rotating machine according to claim 6, wherein said crossover connecting wire portions lie in a plane that is perpendicular to an axial direction of the rotating machine.

* * * * *